US012080232B2

(12) United States Patent
Lee et al.

(10) Patent No.: US 12,080,232 B2
(45) Date of Patent: Sep. 3, 2024

(54) DISPLAY DEVICE FOR LOW POWER DRIVING AND METHOD OF OPERATING THE SAME

(71) Applicant: SAMSUNG ELECTRONICS CO., LTD., Suwon-si (KR)

(72) Inventors: Jonghyun Lee, Goyang-si (KR); Jongoh Lee, Anyang-si (KR); Yuneseok Chung, Suwon-si (KR); Hyeokman Kwon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/201,845

(22) Filed: May 25, 2023

(65) Prior Publication Data

US 2023/0298519 A1 Sep. 21, 2023

Related U.S. Application Data

(62) Division of application No. 17/535,865, filed on Nov. 26, 2021, now Pat. No. 11,705,061.

(30) Foreign Application Priority Data

Jun. 21, 2021 (KR) ........................ 10-2021-0079848

(51) Int. Cl.
*G09G 3/3225* (2016.01)

(52) U.S. Cl.
CPC ... *G09G 3/3225* (2013.01); *G09G 2300/0809* (2013.01); *G09G 2310/06* (2013.01); *G09G 2310/08* (2013.01)

(58) Field of Classification Search
None
See application file for complete search history.

(56) References Cited

U.S. PATENT DOCUMENTS

| | | | |
|---|---|---|---|
| 7,250,788 B2 | 7/2007 | Lee et al. | |
| 8,154,482 B2 | 4/2012 | Lee et al. | |
| 8,531,618 B2 | 9/2013 | Koyama et al. | |
| 8,731,136 B2 | 5/2014 | Shin et al. | |
| 2002/0140685 A1* | 10/2002 | Yamamoto | G09G 3/20 345/204 |
| 2017/0263204 A1* | 9/2017 | Tanaka | G09G 3/3677 |

FOREIGN PATENT DOCUMENTS

| | | | |
|---|---|---|---|
| KR | 2089318 | A | 3/2015 |
| KR | 2138664 | A | 6/2015 |
| KR | 20200057530 | A | 5/2020 |

* cited by examiner

*Primary Examiner* — Christopher J Kohlman
(74) *Attorney, Agent, or Firm* — Fish & Richardson P.C.

(57) ABSTRACT

A display device includes a display panel, a display driver integrated circuit and a driving control circuit. The display panel includes a plurality of pixels connected to a plurality of driving lines and a plurality of source lines. The display driver integrated circuit includes a driving control signal generator. The driving control signal generator generates a driving control signal based on display device information and pixel values corresponding to at least a portion of the plurality of rows among a plurality of previous pixel values of a previous frame and a plurality of present pixel values of a present frame. The driving control circuit selectively connects the display driver integrated circuit with each of the plurality of driving lines based on the driving control signal such that first driving signals provided to first driving lines among the plurality of driving lines are blocked.

6 Claims, 18 Drawing Sheets

10a

DISPLAY DEVICE FOR LOW POWER DRIVING AND METHOD OF OPERATING THE SAME

CROSS-REFERENCE TO RELATED APPLICATION

This is a Divisional of U.S. application Ser. No. 17/535,865, filed Nov. 26, 2021, and a claim of priority under 35 USC § 119 is made to Korean Patent Application No. 10-2021-0079848, filed on Jun. 21, 2021, in the Korean Intellectual Property Office (KIPO), the disclosure of which is incorporated by reference herein in its entirety.

BACKGROUND

1. Technical Field

Example embodiments relate generally to semiconductor integrated circuits and, more particularly, to a display device for low power driving and a method of operating the display device.

2. Discussion of the Related Art

A display system employing an organic light emitting diode (OLED) display device is driven at a high speed of 120 Hz or higher to provide excellent image quality without interruption. However, as the display system is driven at the high speed as described above, power consumption in the display system also increases. In particular, power consumption in a display driver integrated circuit and a display panel included in the display system occupies a high proportion of a total power consumption of the display system.

SUMMARY

Some example embodiments may provide a display device and a method for low power driving, capable of reducing power consumption in a display driver integrated circuit and a display panel.

According to example embodiments, a display device includes a display panel, a display driver integrated circuit and a driving control circuit. The display panel includes a plurality of pixels, connected to a plurality of driving lines and a plurality of source lines, and disposed in a plurality of rows and a plurality of columns in a display area. The display driver integrated circuit generates a plurality of image signals provided to the plurality of source lines and a plurality of driving voltages. The display driver integrated circuit includes a driving control signal generator. The driving control signal generator generates a driving control signal based on display device information and pixel values corresponding to at least a portion of the plurality of rows among a plurality of previous pixel values of a previous frame and a plurality of present pixel values of a present frame displayed on the display panel. The driving control circuit selectively connects the display driver integrated circuit with each of the plurality of driving lines based on the driving control signal such that first driving signals provided to first driving lines among the plurality of driving lines are blocked, the first driving lines corresponding to a first display area in which an updating operation is unnecessary in the display area.

According to example embodiments, in a method of operating a display device, a plurality of previous pixel values of a previous frame and a plurality of present pixel values of a present frame displayed on a display area of a display panel are received. First previous pixel values among the plurality of previous pixel values and second present pixel values among the plurality of present pixel values are extracted based on display device information. The first previous pixel values correspond to a first row group, and the second present pixel values correspond to a second row group. Each of the first row group and the second row group corresponds to a K-th row among a plurality of rows in which a plurality of pixels are disposed, where K is an integer greater than or equal to one. The first previous pixel values are compared with the second present pixel values. A driving control signal is generated based on a result of the comparison such that first driving signals provided to first driving lines among the plurality of driving are blocked. The first driving lines correspond to a first display area in which an updating operation is unnecessary in the display area. A display driver integrated circuit and each of the plurality of driving lines are selectively connected based on the driving control signal.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
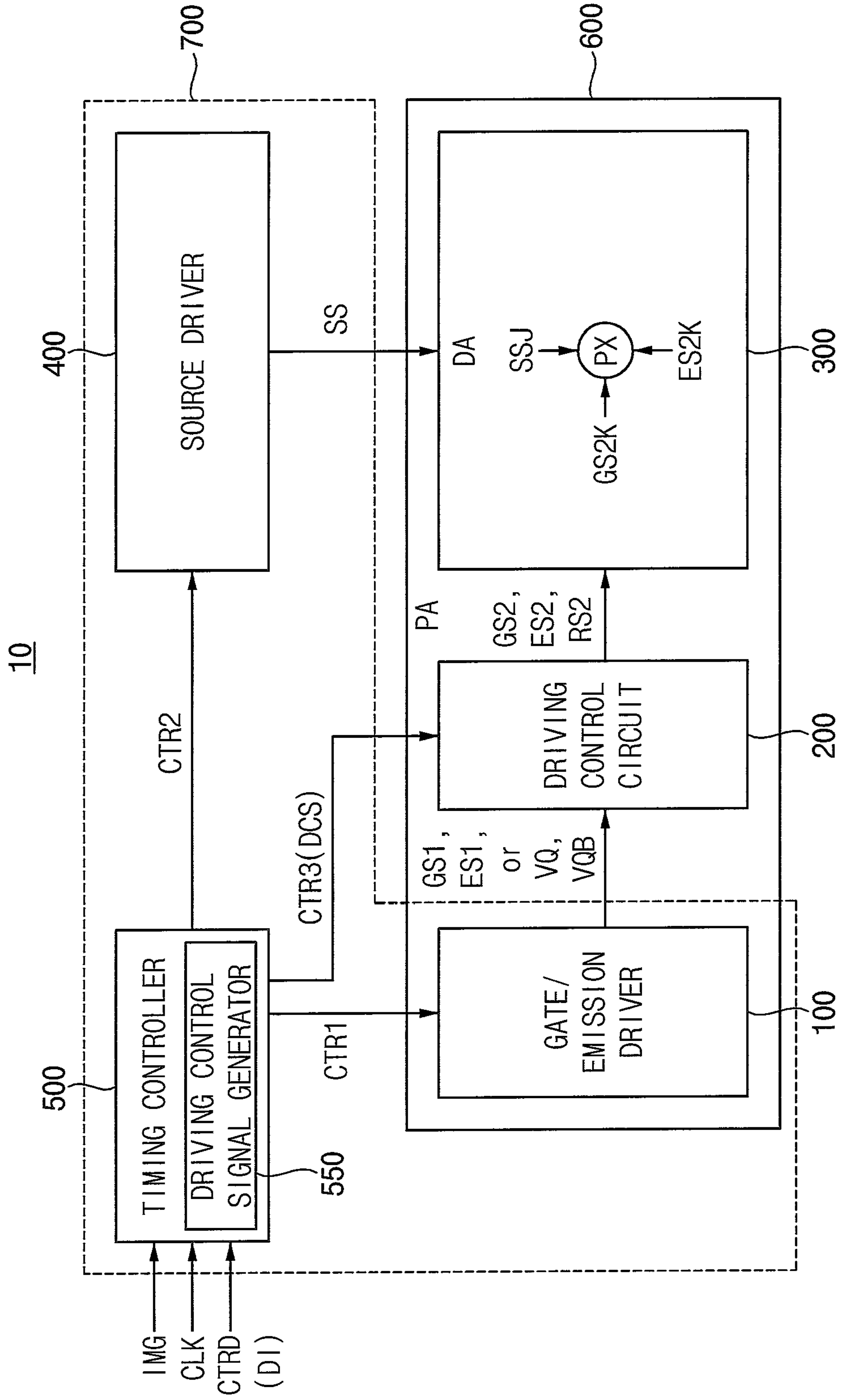
FIG. 1 is a block diagram illustrating a display device according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a block diagram illustrating a display device according to example embodiments.

Referring to FIG. 1, a display device 10 may include a display panel 600 and a display driver integrated circuit 700. The display driver integrated circuit 700 may include a source driver 400, a timing controller 500 and a gate/emission driver 100. And the timing controller 500 may include a driving control signal generator 550.

The display panel 600 may include a display area DA 300 and a peripheral area PA surrounding the display area DA. The display area DA may include a plurality of pixels PX, and the peripheral area PA may include a driving control circuit 200. As illustrated in FIG. 1, the display device may be configured in a gate in panel (GIP) structure in which the gate/emission driver 100 included in the display driver integrated circuit 700 is formed in the peripheral area PA of the display panel 600. In this case, a size of a bezel and a thickness of the display panel 600 of the display device 10 may be reduced.

The timing controller 500 may receive image data IMG, a clock signal CLK and a display device control signal CTRD from outside. The timing controller may generate control signals CTR1, CTR2 and CTR3 based on the image data IMG, the clock signal CLK, and the display device control signal CTRD. Control components 100, 200, 300, 400, 500, 550 and 600 included in the display device 10 may be controlled based on the control signals CTR1, CTR2 and CTR3.

In some embodiments, the image data IMG is digital data related to input images displayed in the display area DA and may include pixel values of a plurality of pixels PX included in the display area DA. For example, the image data IMG may include a plurality of RGB pixel values for the input image and may be data having a resolution of W*H size corresponding to a size of the plurality of pixels PX. The clock signal CLK may be a basic clock for a clock signal provided to each of the components 100, 200, 300, 400, 500, 550 and 600 included in the display device 10. For example, the timing controller 500 may divide the clock signal CLK and provide the divided clock signal to each of the components 100, 200, 300, 400, 500, 550 and 600 included in the display device 10. The display device control signal CTRD may include a command signal, a horizontal synchronization signal, a vertical synchronization signal and a data enable signal and may further include display device information DI. The display device information will be described with reference to FIG. 2.

The display area DA of the display panel 600 may include the plurality of pixels PX connected to a plurality of driving lines and a plurality of source lines.

In some embodiments, the plurality of driving lines may include a plurality of gate lines and a plurality of emission lines. A detailed configuration of the plurality of driving lines will be described with reference to FIG. 3.

In some embodiments, each of the plurality of pixels PX may display images based on driving signals, e.g., GS2K and ES2K, and image signals, e.g., SSJ.

In some embodiments, the plurality of pixels PX may be disposed in a plurality of rows and a plurality of columns. For example, a total of (M*N) pixels may be disposed in M rows and N columns. In this case, M driving lines, e.g., M gate lines and M emission lines, respectively corresponding to the M rows, and N source lines respectively corresponding to the N rows may be formed. The plurality of pixels PX may be connected to the plurality of driving lines to be selected row by row and may be connected to the plurality of source lines to receive the image signals. Each of the plurality of pixels PX may represent one of a plurality of colors. For example, the plurality of colors may represent one of red, green and blue, but example embodiments are not limited thereto.

The gate/emission driver 100 may generate a plurality of driving voltages GS1 and ES1 corresponding to the plurality of driving lines, and the source driver 400 may generate image signals SS provided to the plurality of source lines.

The driving control signal generator 550 may generate a driving control signal, e.g., CTR3, based on the display device information DI included in the display device control signal CTRD and the image data IMG, and provide the driving control signal to the driving control circuit 200. For example, the driving control signal CTR3 may include a plurality of switch control signals. The plurality of switch control signals will be described with reference to FIGS. 9, 10, 12, 13 and 14.

In some embodiments, the driving control signal generator 550 may generate the driving control signal CTR3 based on pixel values corresponding to at least a portion of the plurality of rows among a plurality of previous pixel values of a previous frame and a plurality of present pixel values of a present frame displayed on the display panel 600. For example, the driving control signal generator 550 may generate the driving control signal CTR3 based on first previous pixel values among the plurality of previous pixel values and second present pixel values among the plurality of present pixel values. The first previous pixel values may correspond to a first row group, and the second present pixel values may correspond to a second row group. Each of the first row group and the second row group may correspond to a K-th row among the plurality of rows, where K is an integer greater than or equal to one.

In some embodiments, the driving control signal generator 550 may generate the driving control signal CTR3 to control the driving control circuit 200 based on the driving control signal CTR3 such that a portion of the driving signals provided to first driving lines among the plurality of driving lines are blocked. The first driving lines may correspond to a first display area in which an updating operation is unnecessary in the display area DA.

In some embodiments, the driving control signal generator 550 may generate the driving control signal CTR3 and control the driving control circuit 200 such that a portion of the driving signals (hereinafter, referred to as 'first driving signals') provided to a portion of driving lines (hereinafter, referred to as 'first driving lines') among the plurality of driving lines are blocked, based on the driving control signal CTR3. The first driving lines may correspond to a display area (hereinafter, referred to as 'first display area') in which an updating operation is unnecessary in the display area DA.

The driving control circuit 200 may selectively connect the display driver integrated circuit 700 and each of the plurality of driving lines based on the driving control signal CTR3. The driving control circuit 200 may receive driving voltages GS1 and ES1 from the gate/emission driver 100 and may provide driving signals GS2 and ES2 and reset signal RS2 to all or a portion of the plurality of driving lines.

In some embodiments, the driving control circuit 200 may be disposed in the peripheral area PA of the display panel 600.

In some embodiments, the driving control circuit 200 may include a plurality of switch circuits corresponding to a plurality of gate lines and a plurality of emission lines included in the plurality of driving lines. A detailed description of the driving control circuit 200 will be described with reference to FIGS. 9, 10, 12, 13, 14 and 15.

Based on the above configurations, the display device according to example embodiments may block the first driving signals provided to the first driving lines corresponding to the first display area. In a foldable display device, a rollable display device and a slideable display device in which the display area may be expanded or contracted, the display device according to example embodiments may block the first driving signals to driving lines corresponding to the display area that do not need to be driven before the display area is expanded. Accordingly, power consumption in a display driver integrated circuit and a display panel included in the display device may be effectively reduced. When the display area is expanded, the display device according to example embodiments may provide the first driving signals again to the driving lines corresponding to the expanded display area. Accordingly, the display device according to example embodiments may enable smooth screen switching in the display system when the display area is expanded or contracted.

Figure 2:
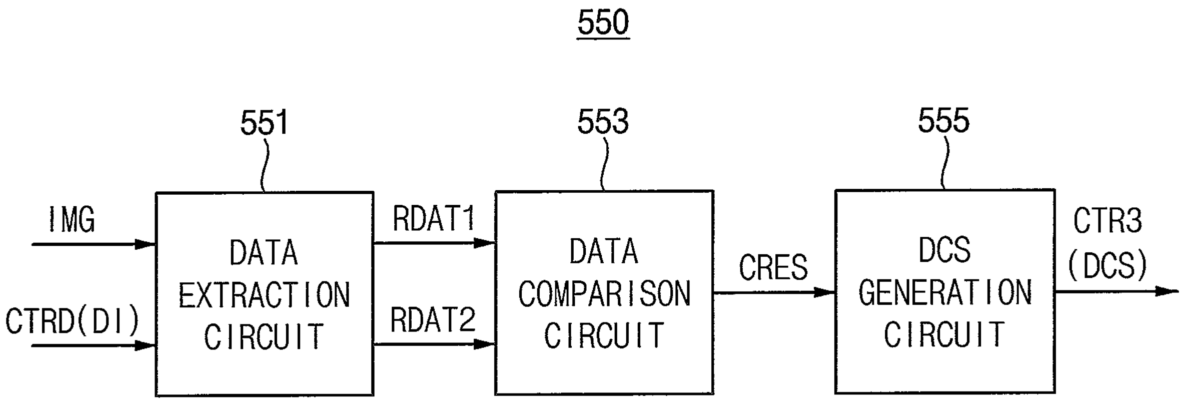
FIG. 2 is a block diagram illustrating an example embodiment of a driving control signal generator included in the display device of FIG. 1.

FIG. 2 is a block diagram illustrating an example embodiment of a driving control signal generator included in the display device of FIG. 1.

Referring to FIGS. 1 and 2, a driving control signal generator 550 may include a data extraction circuit 551, a data comparison circuit 553 and a driving control signal DCS generation circuit 555.

The data extraction circuit 551 may receive image data IMG and display device information DI.

In some embodiments, the display device information DI may be included in the display device control signal CTRD described above with reference to FIG. 1. For example, the display device information DI may include a ratio of the number of a plurality of gate driving signals that drive a plurality of gate lines to the number of a plurality of emission driving signals that drive a plurality of emission lines.

In some embodiments, the image data IMG may include previous pixel values of a previous frame and present pixel values of a present frame displayed on a display area DA of the display panel 600. The previous pixel values and the present pixel values may be temporarily stored in the timing controller 500. The timing controller 500 may include a plurality of frame buffers to store the previous pixel values and the present pixel values.

In some embodiments, the data extraction circuit 551 may extract first previous pixel values RDAT1 among the plurality of previous pixel values and second present pixel values RDAT2 among the plurality of present pixel values. The first previous pixel values may correspond to a first row group, and the second present pixel values may correspond to a second row group. Each of the first row group and the second row group may correspond to a K-th row among the plurality of rows, where K is an integer greater than or equal to one.

For example, as will be described with reference to FIG. 3, when the plurality of gate lines and the plurality of emission lines are formed in a ratio of 1:1, a ratio of the number of gate driving signals to the emission driving signals may also be 1:1. In this case, the first row group and the second row group may be set as one row including only the K-th row. For example, when the plurality of gate lines and the plurality of emission lines are formed in a ratio of 1:2, the first row group and the second row group may be set as two or more rows including the K-th row. For example, when the plurality of gate lines and the plurality of emission lines are formed in a ratio of 1:3, the first row group and the second row group may be set as three or more rows including the K-th row.

In some embodiments, the data extraction circuit 551 may provide the first previous pixel values RDAT1 and the second present pixel values RDAT2 to the data comparison circuit 553.

The data comparison circuit 553 may receive the first previous pixel values RDAT1 and the second present pixel values RDAT2 from the data extraction circuit 551 and compare the first previous pixel values RDAT1 and the second present pixel values RDAT2 to generate comparison result data CRES representing whether the first previous pixel values RDAT1 and the second present pixel values RDAT are equal to each other.

In some embodiments, the data comparison circuit 553 may generate checksum data of the first previous pixel values RDAT1 and the second present pixel values RDAT2 and compare the checksum data with each other to generate the comparison result data CRES. For example, the data comparison circuit 553 may generate first checksum data related to the first previous pixel values RDAT1 and generate second checksum data related to the second present pixel values RDAT2. The data comparison circuit 553 may perform a predetermined hash function or hash table on the first previous pixel values RDAT1 and the second present pixel values RDAT2 to generate the first checksum data and the second checksum data. The data comparison circuit 553 may compare the first checksum data and the second checksum data to generate the comparison result data CRES representing whether the first checksum data and the second checksum data are equal to each other.

In some embodiments, the data comparison circuit 553 may provide the comparison result data CRES to the DCS generation circuit 555.

The DCS generation circuit 555 may receive the comparison result data CRES from the data comparison circuit 553 and generate the driving control signal DCS based on the comparison result data CRES.

In some embodiments, the DCS generation circuit 555 may generate the driving control signal DCS such that the first driving signals are blocked in response to the first previous pixel values RDAT1 being equal to the second present pixel values RDAT2. The DCS generation circuit 555 may generate the driving control signal DCS such that the first driving signals are provided in response to the first previous pixel values RDAT1 being unequal to the second present pixel values RDAT2.

In some embodiments, the DCS generation circuit 555 may generate the driving control signal DCS such that the first driving signals are blocked in response to the first checksum data being equal to the second checksum data. The DCS generation circuit 555 may generate the driving control signal DCS such that the first driving signals are provided in response to the first checksum data being unequal to the second checksum data.

Figure 3:
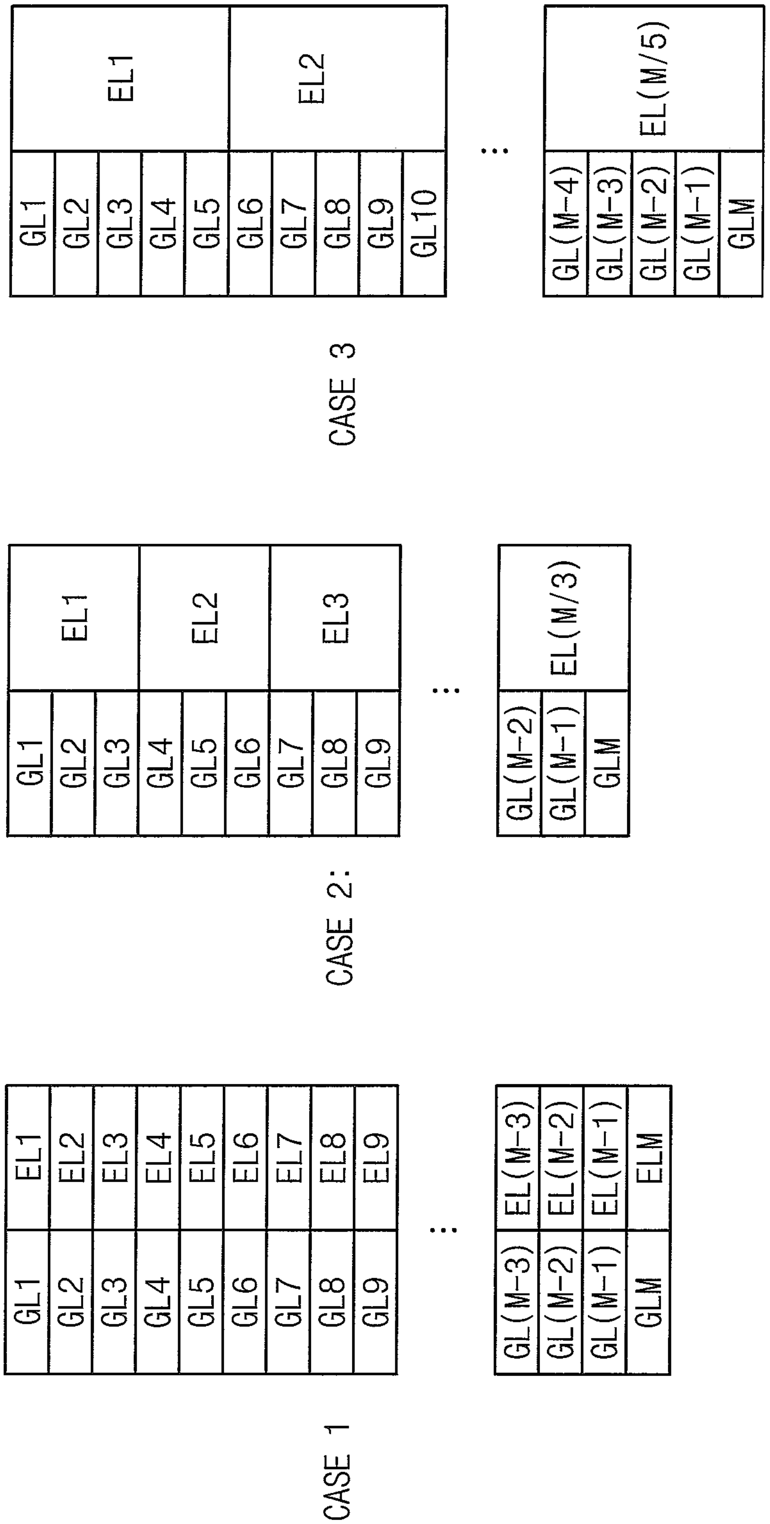
FIG. 3 is a diagram for describing a configuration of a plurality of driving lines included in the display panel in FIG. 1.

FIG. 3 is a diagram for describing a configuration of a plurality of driving lines included in the display panel in FIG. 1.

In FIG. 3, a plurality of cases, e.g., CASE1, CASE2 and CASE3, are illustrated. Each of the plurality of cases is independent of each other. In each of the plurality of cases, a plurality of gate lines GL1, GL2, GL3, GL4, GL5, GL6, GL7, GL8, GL9, GL10, . . . , GL(M−3), GL(M−2), GL(M−1), GLM and a plurality of emission lines EL1, EL2, EL3, EL4, EL5, EL6, EL7, EL8, EL9, EL10, . . . , EL(M−3), EL(M−2), EL(M−1), ELM are illustrated.

Referring to FIG. 3, in the plurality of cases, the plurality of gate lines GL1 to GLM and the plurality of emission lines EL1 to ELM or a portion of the plurality of emission lines EL1 to ELM may correspond to a plurality of rows, in which a plurality of pixels are disposed included, in a display panel. Hereinafter, it is assumed that the plurality of pixels are disposed in M rows, where M is an integer greater that or equal to two.

In the first case (CASE1), the plurality of gate lines GL1 to GLM may be formed to correspond to the plurality of rows, respectively, and the plurality of emission lines EU to ELM may also be formed to correspond to the plurality of rows, respectively. In this case, the plurality of gate lines GL1 to GLM and the plurality of emission lines EU to ELM may be formed one for each of the plurality of rows in which the plurality of pixels is disposed.

In the second case (CASE2), the plurality of gate lines GL1 to GLM may be formed to correspond to the plurality of rows, respectively, and each of the plurality of emission lines EU to EL(M/3) may be formed to correspond to three rows of the plurality of rows. In this case, the plurality of gate lines GL1 to GLM may be formed one for each of the plurality of rows, and the plurality of emission lines EU to EL(M/3) may be formed one for three rows of the plurality of rows.

In the third case (CASES), the plurality of gate lines GL1 to GLM may be formed to correspond to the plurality of rows, respectively, and each of the plurality of emission lines EU to EL(M/5) may be formed to correspond to five rows of the plurality of rows. In this case, the plurality of gate lines GL1 to GLM may be formed one for each of the plurality of rows, and the plurality of emission lines EU to EL(M/5) may be formed one for five rows of the plurality of rows.

As described above, a plurality of gate lines may be formed to correspond to a plurality of rows in which a plurality of pixels are disposed, but a plurality of emission lines may be formed to correspond to one or more of the plurality of rows. In this case, the plurality of pixels may be driven in units of one row using a plurality of gate driving signals provided through the plurality of gate lines, and the plurality of pixels may be driven in units of one or more rows using a plurality of emission driving signals provided through the plurality of emission lines. FIG. 3 illustrates an example in which one or more row of the plurality of rows are simultaneously driven based on one of the plurality of emission lines, but the number of rows simultaneously driven by one of the plurality of emission lines is merely exemplary.

Figure 4:
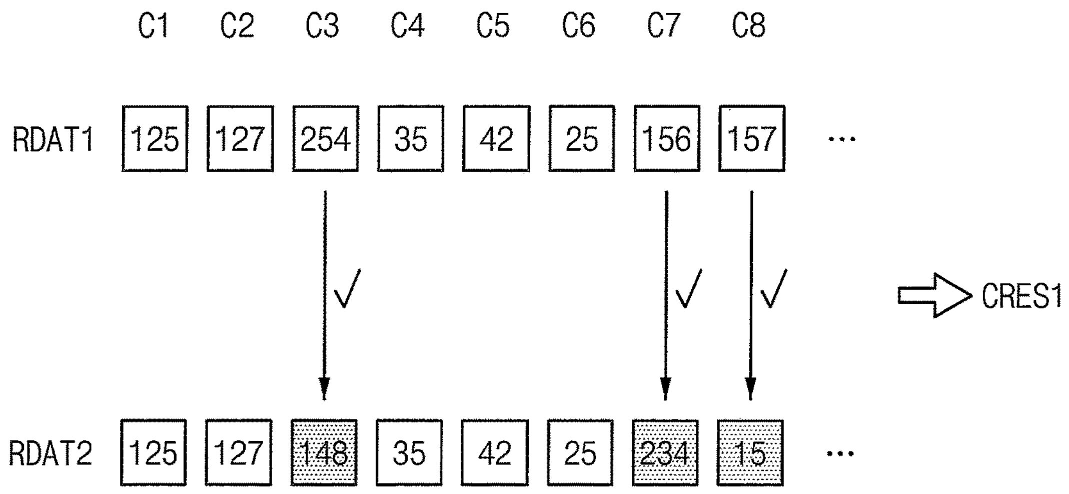
FIGS. 4, 5 and 6 are diagrams for describing a process of generating comparison result data in FIG. 2.
Figure 5:
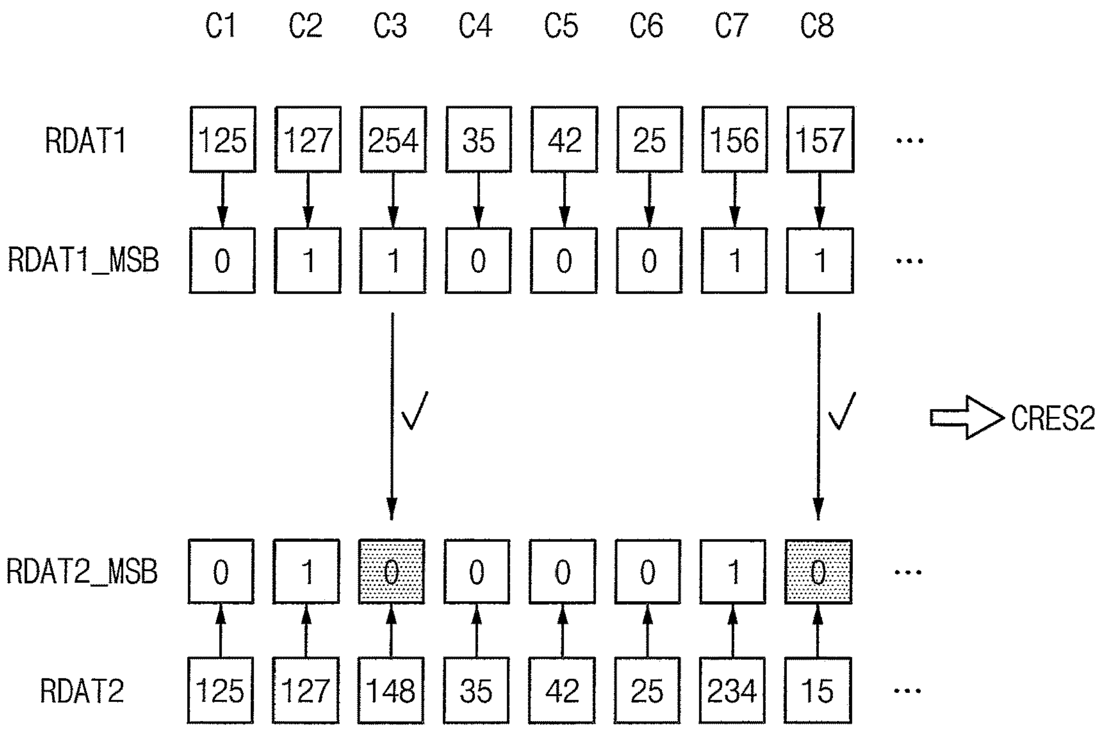
Figure 6:
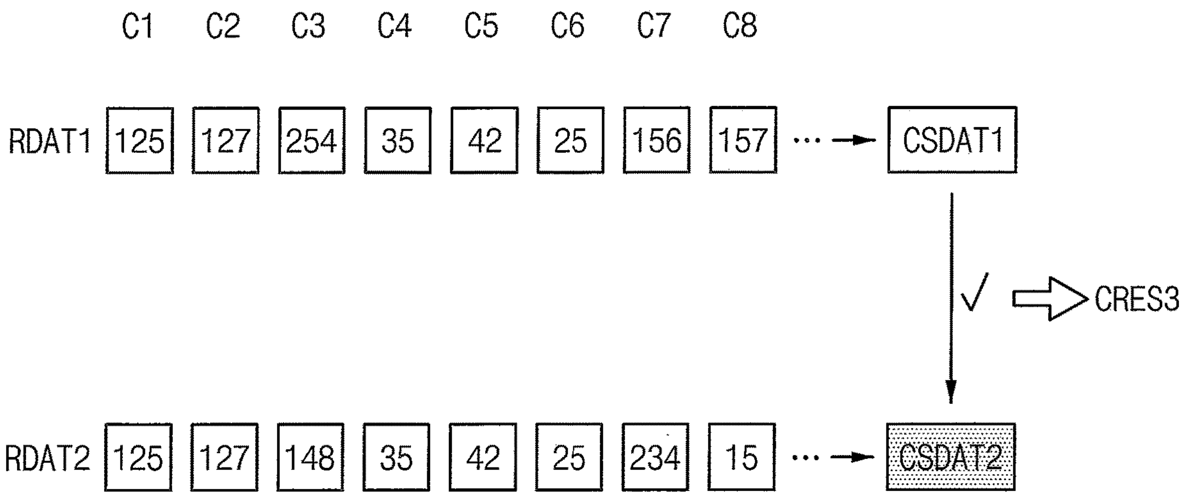

FIGS. 4, 5 and 6 are diagrams for describing a process of generating comparison result data in FIG. 2.

In FIGS. 4, 5 and 6, only a portion of first previous pixel values RDAT1 and a portion of second present pixel values RDAT2 are illustrated for convenience of description. The first previous pixel values RDAT1 and the second present pixel values RDAT2 may be compared by the data comparison circuit 553 described above with reference to FIG. 2. The portion of the first previous pixel values RDAT1 and the portion of the second present pixel values RDAT2 are exemplary, and in FIGS. 4, 5 and 6, for convenience of description, only pixel values corresponding to columns C1, C2, C3, C4, C5, C6, C7 and C8 among a plurality of columns in which a plurality of pixels included in a display panel are disposed are illustrated.

Referring to FIGS. 2 and 4, the first previous pixel values RDAT1 and the second present pixel values RDAT2 are compared to generate comparison result data CRES1. For example, the first previous pixel value '125' corresponding to the first column C1 may be compared with the second present pixel value '125' corresponding to the first column C1. The first previous pixel value '127' corresponding to the second column C2 may be compared with the second present pixel value '127' corresponding to the second column C2. The first previous pixel value '254' corresponding to the third column C3 may be compared with the second present pixel value '148' corresponding to the third column C3. For the remaining columns, e.g., the fourth column C4 to the eighth column C8, in the same manner as the first column C1 to the third column C3, the first previous pixel value may be compared with the second present pixel value. The first previous pixel value may also be compared with the second present pixel value for the remaining columns included in the display panel not illustrated in FIG. 4.

As a result of the comparison, the first previous pixel values RDAT1 and the second present pixel values RDAT2 are not equal in the third column C3, the seventh column C7 and the eighth column C8. In this case, the data comparison circuit 553 may generate the comparison result data CRES1 representing that the first previous pixel values RDAT1 and the second present pixel values RDAT2 are unequal. However, example embodiments are not limited thereto. The data comparison circuit 553 may generate the comparison result data CRES1 representing that the first previous pixel values RDAT1 and the second present pixel values RDAT2 are unequal when the number of pixel values that are unequal between the first previous pixel values RDAT1 and the second present pixel values RDAT2 is greater than or equal to a predetermined first threshold value.

Referring to FIGS. 2 and 5, the most significant bit (MSB) RDAT1_MSB of the first previous pixel values RDAT1 and the MSB RDAT2_MSB of the second present pixel values RDAT2 are compared to generate comparison result data CRES2. For example, the MSB '0' of the first previous pixel value corresponding to the first column C1 may be compared with the MSB '0' of the second present pixel value corresponding to the first column C1. The MSB '1' of the first previous pixel value corresponding to the second column C2 may be compared with the MSB '1' of the second present pixel value corresponding to the second column C2. The MSB '1' of the first previous pixel value corresponding to the third column C3 may be compared with the MSB '0' of the second present pixel value corresponding to the third column C3. For the remaining columns, e.g., the fourth column C4 to the eighth column C8, in the same manner as the first column C1 to the third column C3, the MSB of the first previous pixel value may be compared with the MSB of the second present pixel value. The MSB of the first pixel value may also be compared with the MSB of the second present pixel value for the remaining columns included in the display panel not illustrated in FIG. 5.

As a result of the comparison, the MSB of the first previous pixel values RDAT1 and the MSB of the second present pixel values RDAT2 are not equal in the third column C3 and the eighth column C8. In this case, the data comparison circuit 533 may generate the comparison result data CRES2 representing that the first previous pixel values RDAT1 and the second present pixel values RDAT2 are unequal. However, example embodiments are not limited thereto. The data comparison circuit 553 may generate the comparison result data CRES2 representing that the first previous pixel values RDAT1 and the second present pixel values RDAT2 are unequal when the number of MSBs that are unequal between the MSBs of first previous pixel values RDAT1 and the MSBs of the second present pixel values RDAT2 is greater than or equal to a predetermined second threshold value.

Referring to FIGS. 2 and 6, first checksum data of the first previous pixel values RDAT1 and second checksum data of the second present pixel values RDAT2 are compared to generate comparison result data CRESS. For example, the first checksum data CSDAT1 of the first previous pixel values RDAT1 corresponding to all of the columns C1 to C8 may be compared with the second checksum data CSDAT2 of the second present pixel values RDAT2 corresponding to all of the columns C1 to C8. The first checksum data CSDAT1 of the first previous pixel values RDAT1 may also be compared with the second checksum data CSDAT2 of the second present pixel values RDAT2 for the remaining columns included in the display panel not illustrated in FIG. 6.

As a result of the comparison, when the first checksum data CSDAT1 are not equal to the second checksum data CSDAT2, the data comparison circuit 533 may generate the comparison result data CRES3 representing that the first previous pixel values RDAT1 and the second present pixel values RDAT3 are unequal. However, example embodiments are not limited thereto. The data comparison circuit 533 may generate the comparison result data CRES3 representing the first previous pixel values RDAT1 and the second present pixel values RDAT2 are unequal when the number of bits that are unequal between a plurality of bits included in the first checksum data CSDAT1 and a plurality of bits included in the second checksum data CSDAT2 is greater than or equal to a predetermined third threshold value.

In some embodiments, the first threshold value, the second threshold value and the third threshold value may be determined differently based on a size of the display panel included in a display system and a surrounding environment in which the display system is used.

Figure 7:
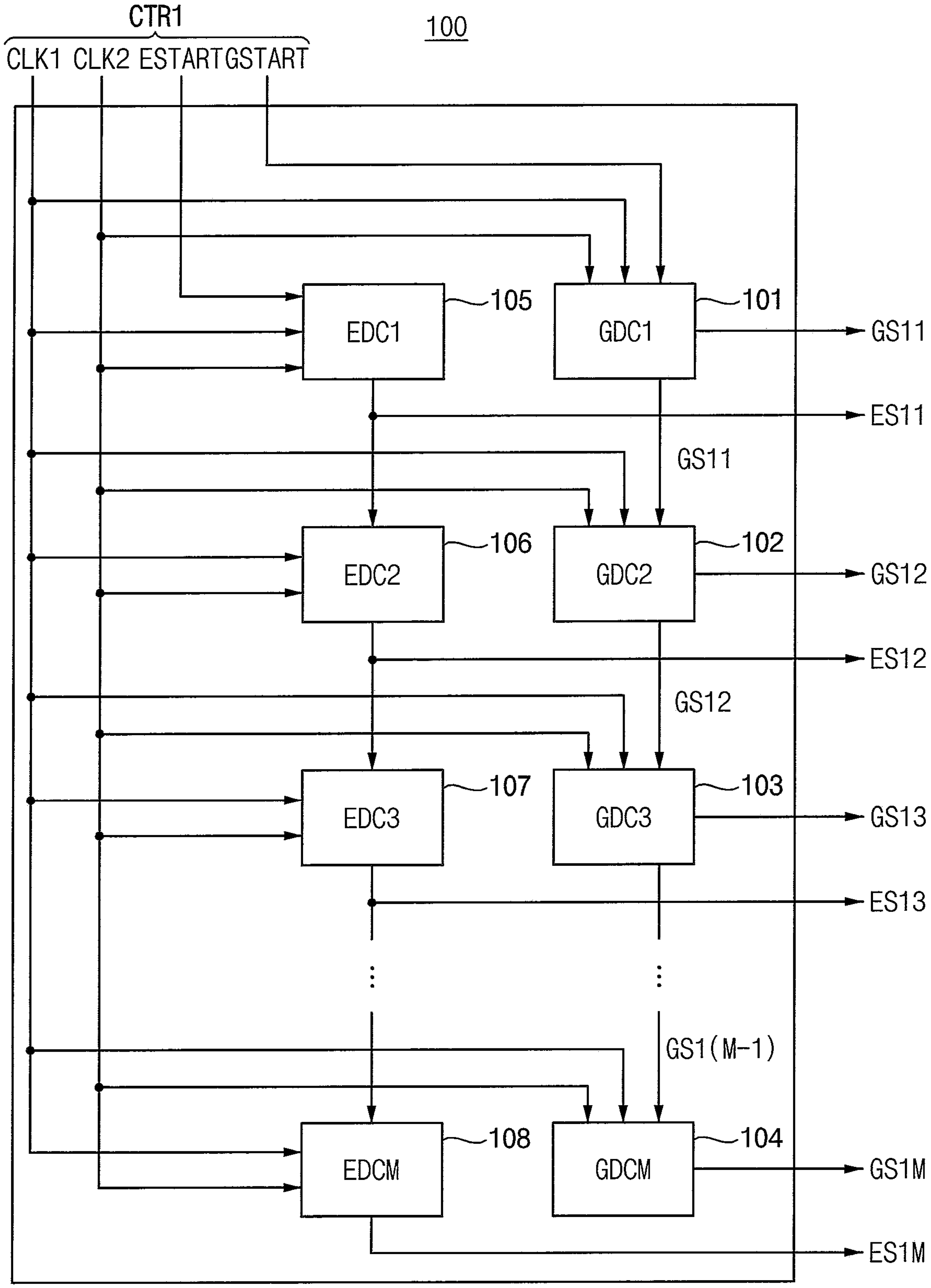
FIG. 7 is a block diagram illustrating an example embodiment of a gate/emission driver included in the display device of FIG. 1.

FIG. 7 is a block diagram illustrating an example embodiment of a gate/emission driver included in the display device of FIG. 1.

Referring to FIG. 7, a gate/emission driver 100 may receive a first control signal CTR1 from outside and generate a plurality of gate driving voltages GS11, GS12, GS13, GS1M and a plurality of emission driving voltages ES11, ES12, ES13, . . . , ES1M based on the first control signal CTR1, where M is an integer greater than or equal to two. The plurality of gate driving voltages GS11, GS12, GS13, . . . , GS1M may correspond to the driving voltages GS1 described above with reference to FIG. 1, and the plurality of emission driving voltages ES11, ES12, ES13, . . . , ES1M may correspond to the driving voltages ES1 described above with reference to FIG. 1.

In some embodiments, the first control signal CTR1 may be generated by the timing controller 500 described above with reference to FIG. 1. The first control signal CTR1 may include a gate driving start signal GSTART, a first clock signal CLK1, and a second clock signal CLK2, and may further include an emission driving start signal ESTART.

The gate/emission driver 100 may include a plurality of gate driver circuits 101, 102, 103 and 104 and a plurality of emission driver circuits 105, 106, 107 and 108.

In some embodiments, the first clock signal CLK1 and the second clock signal CLK2 may be provided in common to each of the plurality of gate driver circuits 101, 102, 103 and 104 and a plurality of emission driver circuits 105, 106, 107 and 108.

In some embodiments, the gate driving start signal GSTART may be provided to the first gate driver circuit 101 among the plurality of gate driver circuits 101, 102, 103 and 104, and the emission driving start signal ESTART may be provided to the first emission driver circuit 105 among the plurality of emission driver circuits 105, 106, 107 and 108.

Each of the plurality of gate driver circuits 101, 102, 103 and 104 and the plurality of emission driver circuits 105, 106, 107 and 108 may be implemented in a form of a shift register to form a plurality of stages, and an output signal of each of the plurality of gate driver circuits 101, 102, 103 and the plurality of emission driver circuits 105, 106 and 107 may be inputted to a next stage to serve as a driving start signal, e.g., the gate driving start signal GSTART and the emission driving start signal ESTART.

In some embodiments, the gate/emission driver 100 may correspond to the first case CASE1 described above with reference to FIG. 3. For example, each of the plurality of gate lines and the plurality of emission lines may be formed to correspond to a plurality of rows of a display panel, respectively. In this case, the number of the plurality of gate driver circuits 101, 102, 103 and 104 is equal to the number of the plurality of rows, and the number of the plurality of emission driver circuits 105, 106, 107 and 108 may also be equal to the number of the plurality of rows.

In some embodiments, the plurality of gate driver circuits 101, 102, 103 and 104 may generate gate driving voltages GS11, GS12, GS13 and GS1M corresponding to the plurality of gate lines, and the plurality of emission driver circuits 105, 106, 107 and 108 may generate emission driving voltages ES11, ES12, ES13 and ES1M corresponding to the plurality of emission lines.

Figure 8:
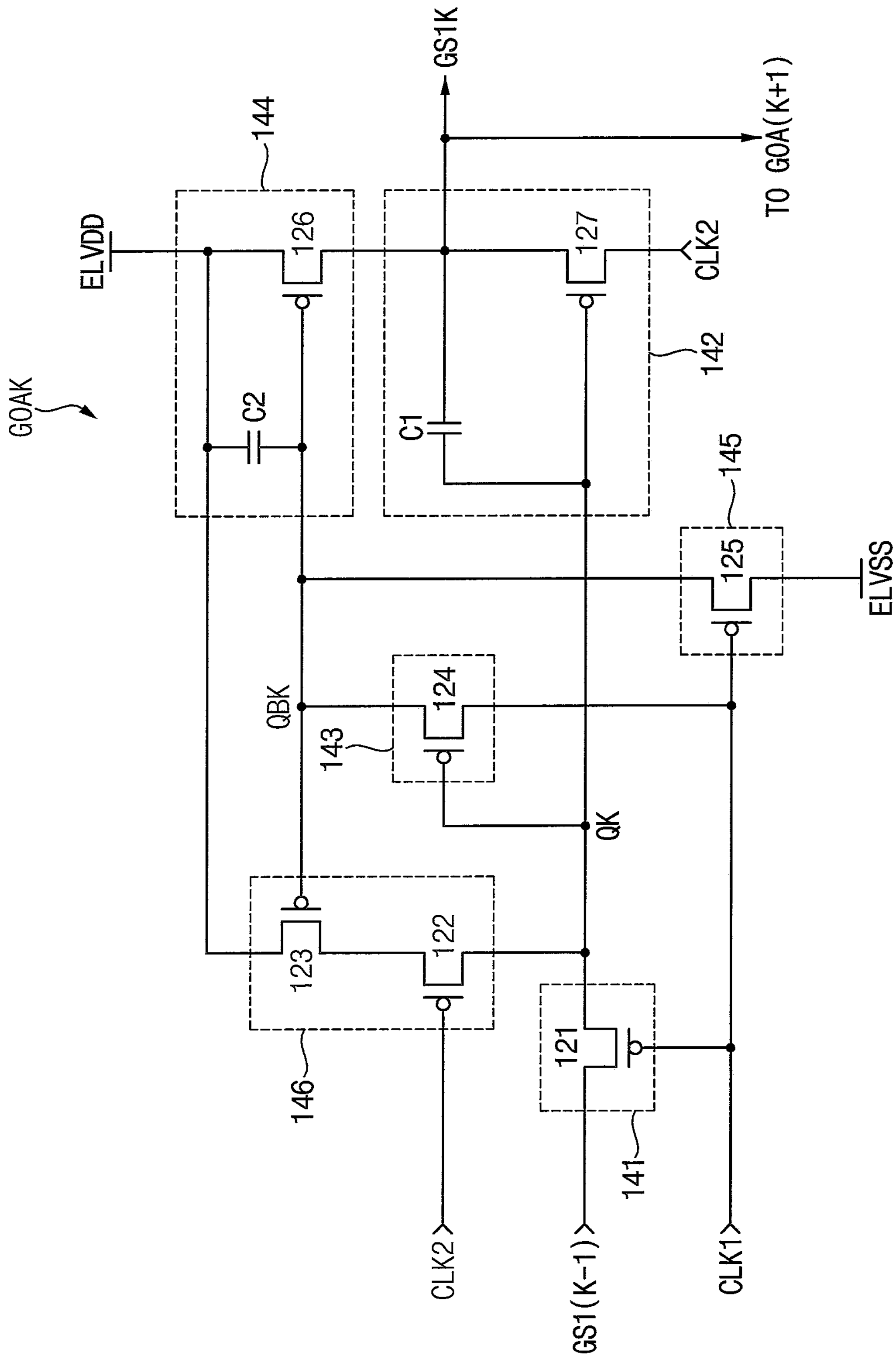
FIG. 8 is a circuit diagram illustrating an example embodiment of a gate driver circuit included in the gate/emission driver of FIG. 7.

FIG. 8 is a circuit diagram illustrating an example embodiment of a gate driver circuit included in the gate/emission driver of FIG. 7.

In FIG. 8, a gate driver circuit GOAK may correspond to the K-th gate driver circuit among the plurality of gate driver circuits GDC1, GDC2, GDC3, . . . , GDCM 101, 102, 103 and 104 illustrated in FIG. 7, where K is an integer greater than or equal to one and less than or equal to M.

Referring to FIGS. 7 and 8, the gate driver circuit GOAK may include a first input unit 141, a first output unit 142, a second input unit 143, a second output unit 144 and a holding unit 145 and a stabilizing unit 146.

The first input unit 141 may include a p-type metal oxide semiconductor (PMOS) 121, the second input unit 143 may include a PMOS transistor 124, the first output unit 142 may include a PMOS transistor 127 and a capacitor C1, the second output unit 144 may include a PMOS transistor 126 and a capacitor C2, the holding unit 145 may include a PMOS transistor 125, and the stabilizing unit 146 may include PMOS transistors 122 and 123.

The first input unit 141 may apply an output voltage GS1(K−1) of a previous stage to a first node QK in response to a first clock signal CLK1, and the first output unit 142 may output a second clock signal CLK2 to an output node as a K-th gate driving voltage GS1K in response to the first node signal applied to the first node QK. The first node QK may be connected to one end of a first capacitor, e.g., the capacitor C1 included in the first output unit 142, that is included in one of the plurality of gate driver circuits 101, 102, 103 and 104 and is repeatedly charged and discharged corresponding to an active time interval.

The second input unit 143 may apply the first clock signal CLK1 to a second node QKB in response to the first node signal, and the second output unit 144 may output a power voltage ELVDD to the output node as the K-th gate driving voltage GS1K in response to the second node signal applied to the second node QBK. The second node QBK may be connected to one end of a second capacitor, e.g., the capacitor C2 included in the second output unit 144, that is included in one of the plurality of gate driver circuits 101, 102, 103 and 104 and is different from the first capacitor.

In some embodiments, the first node QK may be charged to have a voltage level greater than or equal to a threshold voltage level of the PMOS transistor 127 that is connected to the output node and receives a voltage of the first node QK as a gate signal before the K-th gate driving signal GS1*k* is outputted, i.e., before the active period. The second node QBK may be charged to have a voltage level lower than a threshold voltage level of the PMOS transistor 126 that is connected to the output node and receives a voltage of the second node QBK as a gate signal before the K-th gate driving signal GS1*k* is outputted. The PMOS transistor 127 may be referred to as a 'first driving transistor', and the PMOS transistor 126 may be referred to as a 'second driving transistor'. The first node may be connected to a gate electrode of the first driving transistor, and the second node may be connected to the second driving transistor.

The stabilizing unit 146 may stabilize the K-th gate driving voltage GS1K in response to the second node signal and the second clock signal CLK2, and the holding unit 147 may hold the second node signal in response to the first clock signal CLK1.

Figure 9:
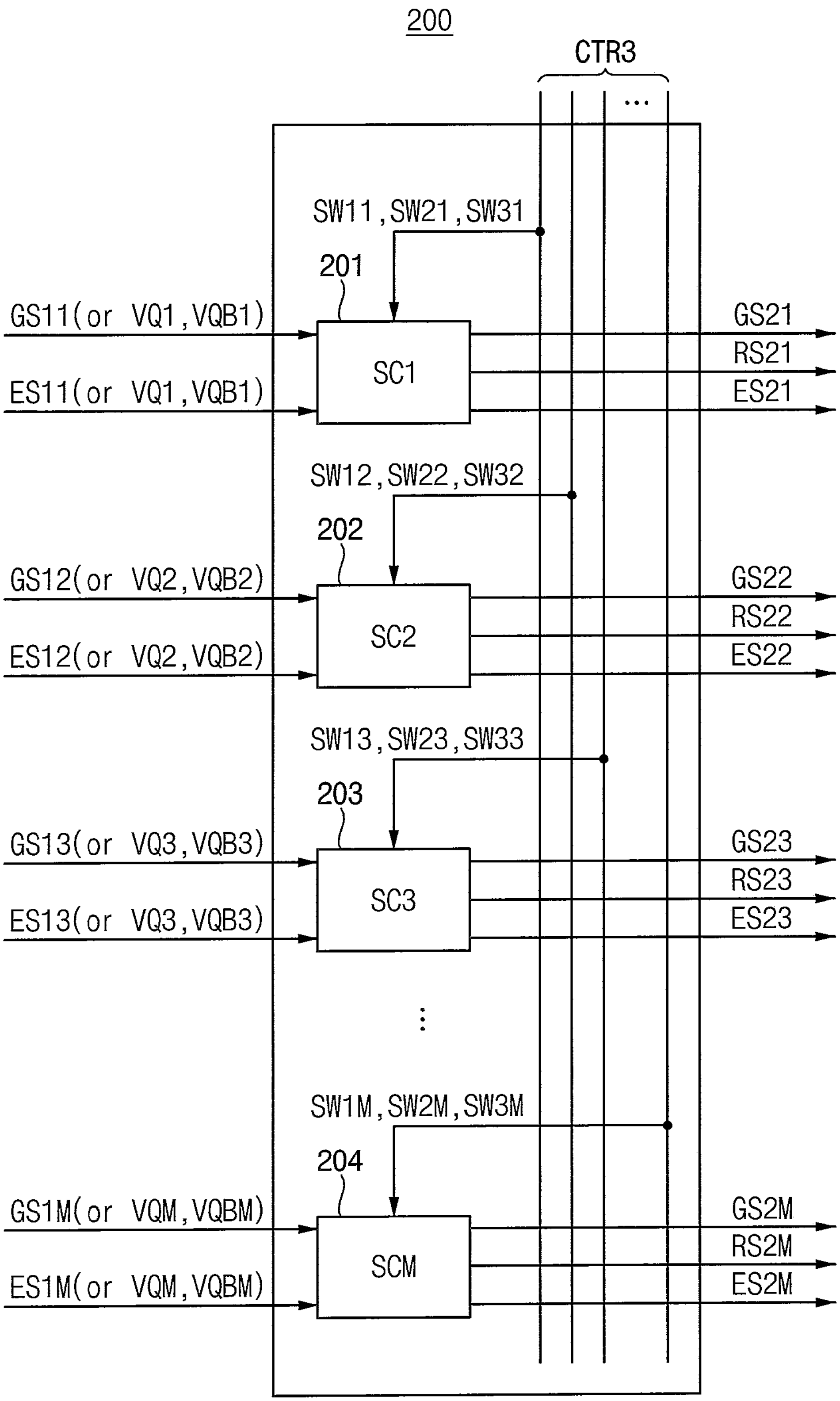
FIG. 9 is a block diagram illustrating an example embodiment of a driving control circuit in FIG. 1.

FIG. 9 is a block diagram illustrating an example embodiment of a driving control circuit in FIG. 1.

Referring to FIG. 9, a driving control circuit 200 may receive a third control signal CTR3 from outside and receive a plurality of gate driving voltages GS11, GS12, GS13 and GS1M and a plurality of emission driving voltages ES11, ES12, ES13 and ES1M.

In some embodiments, the driving control signal 200 may receive the voltages, e.g., VQ1, VQ2, VQ3, . . . , VQM, of the first node QK and the voltages, e.g., VQB1, VQB2, VQB3, . . . , VQM, of the second node QBK instead of the plurality of gate driving voltages GS11, GS12, GS13 and GS1M and the plurality of emission driving voltages ES11, ES12, ES13 and ES1M.

In some embodiments, the driving control circuit 200 may receive the third control signal CTR3 from the timing controller 500 described above with reference to FIG. 1, and receive the plurality of gate driving voltages GS11, GS12, GS13 and GS1M and the plurality of emission driving voltages ES11, ES12, ES13 and ES1M or receive the voltages, e.g., VQ1, VQ2, VQ3, . . . , VQM, of the first node QK and the voltages, e.g., VQB1, VQB2, VQB3, . . . , VQM, of the second node QBK from the gate/emission driver 100 described above with reference to FIG. 7.

The driving control circuit 200 may provide all or a portion of a plurality of gate driving signals GS21, GS22, GS23 and GS2M, a plurality of reset signals RS21, RS22, RS23 and RS2M and a plurality of emission driving signals ES21, ES22, ES23 and ES2M to all or a portion of a plurality of gate lines and a plurality of emission lines included in a display panel. The plurality of gate driving signals GS21, GS22, GS23 and GS2M may correspond to the driving signal GS2 described above with reference to FIG. 1, the plurality of reset signals RS21, RS22, RS23 and RS2M may correspond to the reset signal RS2 described above with reference to FIG. 1, and the plurality of emission driving signals ES21, ES22, ES23 and ES2M may correspond to the driving signal ES2 described above with reference to FIG. 1.

The driving control circuit 200 may include a plurality of switch circuits 201, 202, 203 and 204.

In some embodiments, corresponding gate driving voltages, emission driving voltages and switch control signals may be provided to each of the plurality of switch circuits 201, 202, 203 and 204. For example, the first gate driving voltage GS11, the first emission driving voltage ES11 and the switch control signals SW11, SW21 and SW31 may be provided to the first switch circuit 201 of the plurality of switch circuits 201, 202, 203 and 204. The second gate driving voltage GS12, the second emission driving voltage ES12 and the switch control signals SW12, SW22 and SW32 may be provided to the second switch circuit 202 of the plurality of switch circuits 201, 202, 203 and 204. The third gate driving voltage GS13, the third emission driving voltage ES13 and the switch control signals SW13, SW23 and SW33 may be provided to the third switch circuit 203 of the plurality of switch circuits 201, 202, 203 and 204. The M-th gate driving voltage GS1M, the M-th emission driving voltage ES1M and the switch control signals SWIM, SW2M and SW3M may be provided to the M-th switch circuit 204 of the plurality of switch circuits 201, 202, 203 and 204.

In some embodiments, a corresponding voltage of the first node QK, a voltage of the second node QBK, and switch control signals may be provided to each of the plurality of switch circuits 201, 202, 203 and 204. For example, a voltage VQ1 of the first node and a voltage VQB1 of the second node may be provided to the first switch circuit 201, a voltage VQ2 of the first node and a voltage VQB2 of the second node may be provided to the second switch circuit 202, a voltage VQ3 of the first node and a voltage VQB3 of the second node may be provided to the third switch circuit 201, and a voltage VQM of the first node and a voltage VQBM of the second node may be provided to the M-th switch circuit 204.

In some embodiments, the first switch circuit 201 may provide the first gate driving signal GS21, the first emission driving signal ES21 and the first reset signal RS21 externally based on the switch control signals SW11, SW21 and SW31. The second switch circuit 202 may provide the second gate driving signal GS22, the second emission driving signal ES22 and the second reset signal RS22 externally based on the switch control signals SW12, SW22 and SW32. The third switch circuit 203 may provide the third gate driving signal GS23, the third emission driving signal ES23 and the third reset signal RS23 externally based on the switch control signals SW13, SW23 and SW33. The M-th switch circuit 204 may provide the M-th gate driving signal GS2M, the M-th emission driving signal ES2M and the M-th reset signal RS2M externally based on the switch control signals SWIM, SW2M and SW3M.

Figure 10:
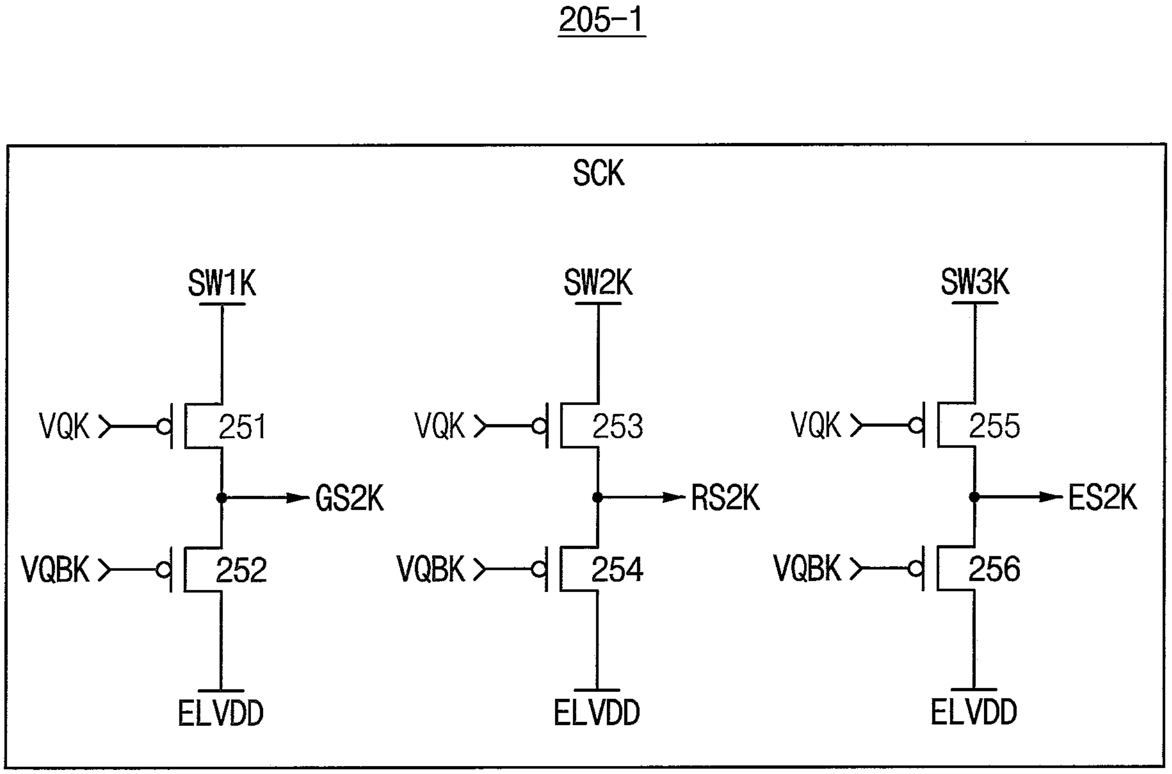
FIG. 10 is a circuit diagram illustrating an example embodiment of a switch circuit included in the driving control circuit of FIG. 9.

FIG. 10 is a circuit diagram illustrating an example embodiment of a switch circuit included in the driving control circuit of FIG. 9.

In FIG. 10, a switch circuit 205-1 may correspond to a K-th switch circuit among the plurality of switch circuits (SC1, SC2, SC3, . . . , SCM) 201, 202, 203 and 204 in FIG. 9, where K is an integer greater than or equal to one and less than or equal to M. Each of the plurality of switch circuits 201, 202, 203 and 204 may provide first driving signals based on a voltage of a first node, a second node and a driving control signal.

Referring to FIG. 10, the switch circuit 205-1 may include a plurality of sub-switch circuits. The plurality of sub-switch circuits may include a first sub-switch circuit, a second sub-switch circuit and a third sub-switch circuit. The first sub-switch circuit may include PMOS transistors 251 and 252, the second sub-switch circuit may include PMOS transistors 253 and 254, and the third sub-switch circuit may include PMOS transistors 255 and 256.

In some embodiments, the first sub-switch circuit and the second sub-switch circuit may be connected between one of the plurality of gate driver circuits in FIG. 7 and one of a plurality of gate lines included in a display panel. The third sub-switch circuit may be connected between one of the plurality of emission driver circuits in FIG. 7 and one of a plurality of emission lines included in the display panel.

In some embodiments, the first sub-switch circuit may be referred to as a 'gate switch circuit', the second sub-switch circuit may be referred to as a 'gate reset switch circuit', and the third sub-switch circuit may be referred to as an 'emission switch circuit'.

In some embodiments, the driving control signal, e.g., CTR3 in FIG. 1, may include switch control signals SW1K, SW2K and SW3K.

In some embodiments, the gate switch circuit may include a PMOS transistor 251 and a PMOS transistor 252 connected in series between the switch control signal SW1K and a first power supply voltage ELVDD, the gate reset switch circuit may include a PMOS transistor 253 and a PMOS transistor 254 connected in series between the switch control signal SW2K and the first power supply voltage ELVDD, and the emission switch circuit may include a PMOS transistor 255 and a PMOS transistor 256 connected in series between the switch control signal SW3K and the first power voltage ELVDD.

In some embodiments, a gate terminal of each of the PMOS transistor 251, the PMOS transistor 253 and the PMOS transistor 255 may receive the voltage VQK, e.g., the first node signal, of the first node QK included in the display driver integrated circuit described above with reference to FIG. 8.

In some embodiments, a gate terminal of each of the PMOS transistor 252, the PMOS transistor 254 and the PMOS transistor 256 may receive the voltage VQBK, e.g., the second node signal, of the second node QBK included in the display driver integrated circuit described above with reference to FIG. 8.

Figure 11:
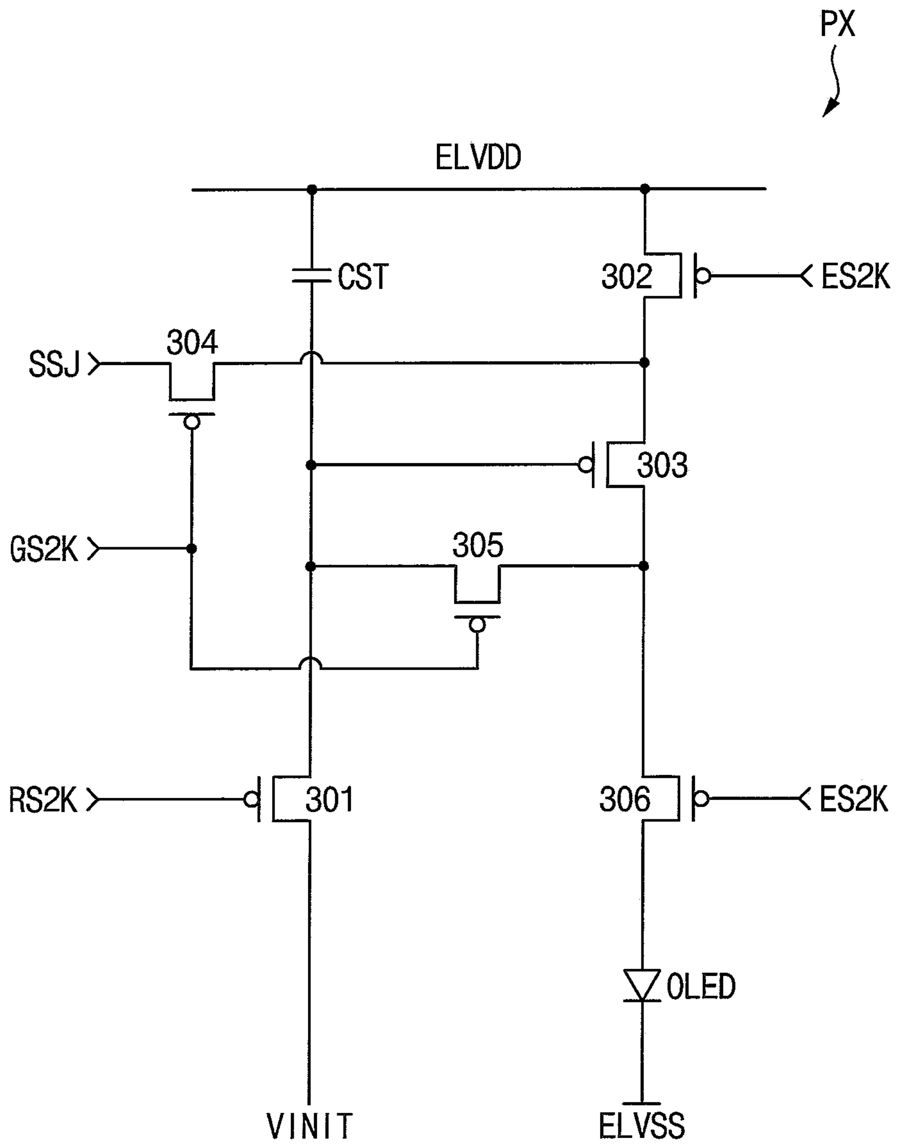
FIG. 11 is a circuit diagram illustrating an example embodiment of an organic light emitting diode (OLED) pixel included in the display panel in FIG. 1.

FIG. 11 is a circuit diagram illustrating an example embodiment of an organic light emitting diode (OLED) pixel included in the display panel in FIG. 1.

Referring to FIG. 11, a pixel PX may include a plurality of PMOS transistors 301, 302, 303, 304, 305 and 306, a capacitor CST, and an organic light emitting diode OLED.

The first PMOS transistor 303 may generate a driving current, and the second PMOS transistor 304 may transmit a data signal SSJ to the first PMOS transistor 303 in response to a gate driving signal GS2K. The third PMOS transistor 305 may drive the first PMOS transistor 303 to operate as a diode in response to the gate driving signal GS2K.

The capacitor CST may store the data signal SSJ transmitted through the second PMOS transistor 304 and the first PMOS transistor 303 operating as the diode.

The fourth PMOS transistor 301 may provide an initialization voltage VINIT to the capacitor CST and a gate terminal of the first PMOS transistor 303 in response to the reset signal RS2K. The fifth PMOS transistor 302 may transmit a power supply voltage ELVDD to the first PMOS transistor 303 in response to an emission driving signal ES2K provided from an emission driver circuit. The sixth PMOS transistor 306 may connect the first PMOS transistor 303 and the OLED in response to the emission driving signal ES2K.

The OLED may emit light based on the driving current flowing from the power supply voltage ELVDD to the ground voltage ELVSS.

In one embodiment, each of the plurality of PMOS transistors 301, 302, 303, 304, 305 and 306 may be implemented as a low-temperature polycrystalline silicon (LTPS) PMOS transistor suitable for low-power driving to reduce power consumption of a display system. Although each of the transistors 301, 302, 303, 304, 305 and 306 included in the pixel PX is illustrated as being implemented as a PMOS transistor in FIG. 11, in another embodiment, the fourth PMOS transistor 301 may be implemented as an oxide n-type metal oxide semiconductor NMOS transistor.

Figure 12:
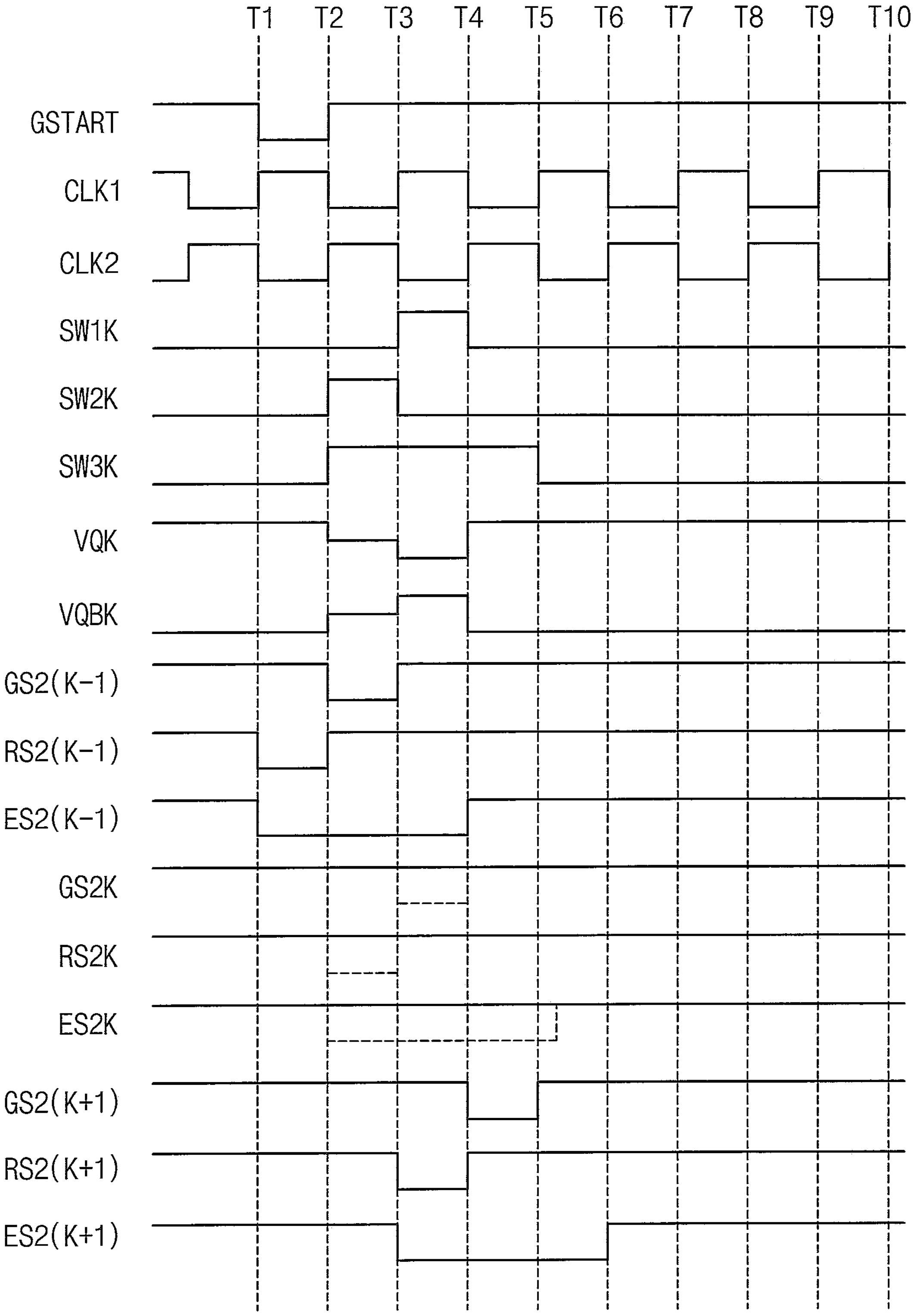
FIG. 12 is a timing diagram for describing an operation of the switch circuit of FIG. 10.

FIG. 12 is a timing diagram for describing an operation of the switch circuit of FIG. 10.

In FIG. 12, a plurality of time points T1, T2, T3, T3, T4, T5, T6, T7, T8, T9 and T10 and a plurality of signals GSTART, CLK1, CLK2, SW1K, SW2K, SW3K, VQK, VQBK, GS2(K−1), RS2(K−1), ES2(K−1), GS2K, RS2K, ES2K, GS2(K+1), RS2(K+1), ES2(K+1) is illustrated.

Referring to FIG. 12, a time interval between adjacent time points among the plurality of time points T1 to T10, e.g., a time interval between a first time point T1 and a second time point T2, may correspond to a time interval, e.g., '1H time interval', required to drive one row included in a display panel, e.g., DA in FIG. 1.

The plurality of signals GS2(K−1), RS2(K−1), ES2(K−1) may be signals provided to the display panel to drive a (K−1)-th row of the display panel, the plurality of signals GS2K, RS2K, and ES2K may be signals provided to the display panel to drive a K-th row of the display panel, and the plurality of signals GS2(K+1), RS2(K+1) and ES2(K+1) may be signals provided to the display panel to drive a (K+1)-th row of the display panel.

When the plurality of signals GS2(K−1), RS2(K−1), ES2(K−1), GS2K, RS2K, ES2K, GS2(K+1), RS2(K+1), ES2(K+1) correspond to a logic low level, it is considered that driving of a corresponding row of the display panel including a pixel, e.g., the OLED pixel of FIG. 11, is performed.

A plurality of pixels disposed in a plurality of rows included in the display panel are sequentially driven in an order of the (K−1)-th row, the K-th row and the (K+1)-th row. In particular, the K-th row may correspond to the first display area in which an updating operation is unnecessary in the display is described above with reference to FIG. 1. Thus, it is considered that driving signals, e.g., the first driving signals, provided to the K-th driving line are blocked.

At the plurality of time points T1, T2, T3, T3, T4, T5, T6, T7, T8, T9 and T10, a voltage level of each of the first clock signal CLK1 and the second clock signals CLK2 may transition form a logic high level to a logic low level or vice versa. At the first time point T1, the voltage level of the gate start signal GSTART described above with reference to FIG. 7 may transition from the logic high level to the logic low level.

At the first time point T1, a voltage level of a reset signal RS2(K−1) corresponding to the (K−1)-th row of the display panel may transition to a logic low level and an initialization for a plurality of pixels disposed in the (K−1)-th row may be performed. At the second time point T2, the voltage level of the gate driving signal GS2(K−1) corresponding to the (K−1)-th row may transition to the logic low level and a plurality of pixels disposed in the (K−1)-th row may be driven. For the driving, the voltage level of the emission driving signal ES2(K−1) corresponding to the (K−1)-th row is maintained at the logic low level from the first time point T1 to the fourth time point T4.

At the third time point T3, a voltage level of a reset signal RS2(K+1) corresponding to the K-th row of the display panel may transition to the logic low level and an initialization for a plurality of pixels disposed in the (K+1)-th row may be performed. At the fourth time point T4, the voltage level of the gate driving signal GS2(K+1) corresponding to the (K+1)-th row may be driven. For the driving, the voltage level of the emission driving signal ES2(K+1) corresponding to the (K+1)-th row is maintained at the logic low level from the third time point T3 to the sixth time point T6.

However, the voltage level of the first switch control signal SW1K transitions to the logic high level at the third time point T3 and is maintained until the fourth time point T4, the voltage level of the second switch control signal SW2K transitions to the logic high level at the second time point T2 and is maintained until the third time point T3, and the voltage level of the third switch control signal SW3K transitions to the logic high level at the second time point T2 and is maintained until the fifth time point T5. Thus, at the second time point T2, the voltage level of the reset signal RS2K corresponding to the K-th row of the display panel does not transition to the logic low level and still maintains the logic high level. At the third time point T3, the voltage level of the gate driving signal GS2K corresponding to the K-th row does not transition to the logic low level and still maintains the logic high level. From the second time point T2 to the fifth time point T5, the voltage level of the emission driving signal ES2K corresponding to the K-th row does not transition to the logic low level and still maintains the logic high level.

Figure 13:
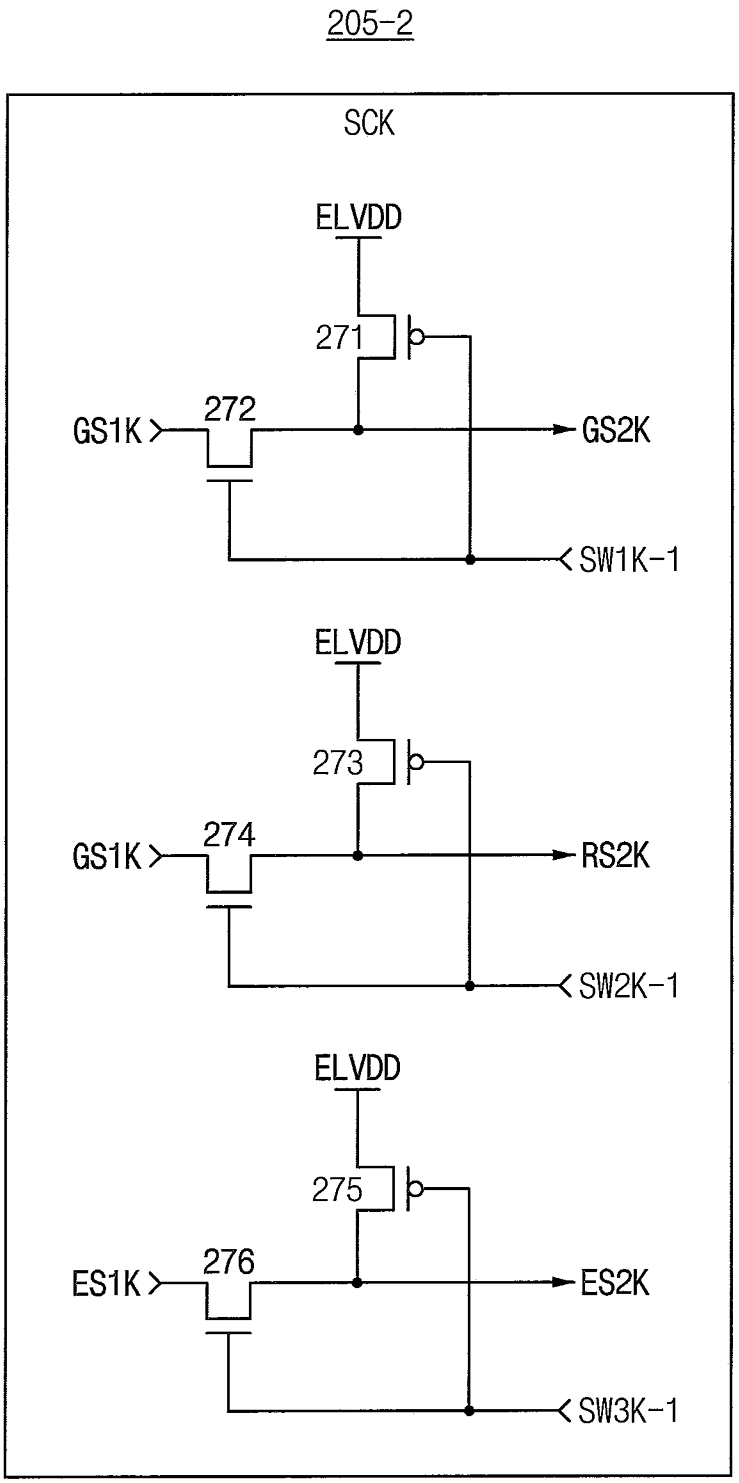
FIG. 13 is a circuit diagram illustrating an example embodiment of a switch circuit included in the driving control circuit of FIG. 9.

FIG. 13 is a circuit diagram illustrating an example embodiment of a switch circuit included in the driving control circuit of FIG. 9.

In FIG. 13, a switch circuit 205-2 may correspond to a K-th switch circuit among the plurality of switch circuits (SC1, SC2, SC3, . . . , SCM) 201, 202, 203 and 204 illustrated in FIG. 9, where K is an integer greater than or equal to one and less than or equal to M.

Referring to FIG. 13, the switch circuit 205-2 may include a plurality of sub-switch circuits. The plurality of sub-switch circuits may include a fourth sub-switch circuit, a fifth sub-switch circuit and a sixth sub-switch circuit. The fourth sub-switch circuit and the fifth sub-switch circuit may be connected between one of the plurality of gate driver circuits in FIG. 7 and one of a plurality of gate lines included in a display panel. The sixth sub-switch circuit may be connected between one of the plurality of emission driver circuits in FIG. 7 and one of a plurality of emission lines included in the display panel.

In some embodiments, the fourth sub-switch circuit may include a PMOS transistor 271 and an NMOS transistor 272, the fifth sub-switch circuit may include a PMOS transistor 273 and an NMOS transistor 274, and the sixth sub-switch circuit may include a PMOS transistor 275 and an NMOS transistor 276.

In some embodiments, the fourth sub-switch circuit may be referred to as a 'gate switch circuit', the fifth sub-switch circuit may be referred to as a 'gate reset switch circuit', and the sixth sub-switch circuit may be referred to as a 'emission switch circuit'.

In some embodiments, the gate switch circuit may include a PMOS transistor 271 and an NMOS transistor 272 connected in series between an output line of one of a plurality of gate driving circuits and a first power supply voltage ELVDD, the gate reset switch circuit may include a PMOS transistor 273 and an NMOS transistor 274 connected in series between the output line of the plurality of gate driving circuit and the first power supply voltage ELVDD, and the emission switch circuit may include a PMOS transistor 275 and an NMOS transistor 276 connected in series between an output line of one of a plurality of emission driving circuits and the first power supply voltage ELVDD.

In some embodiments, a gate terminal of each of the PMOS transistor 271 and the NMOS transistor 272 may receive the switch control signal SW1K−1, a gate terminal of each of the PMOS transistor 273 and the NMOS transistor 274 may receive the switch control signal SW2K−1, and a gate terminal of each of the PMOS transistor 275 and the NMOS transistor 276 may receive the switch control signal SW3K−1.

Figure 14:
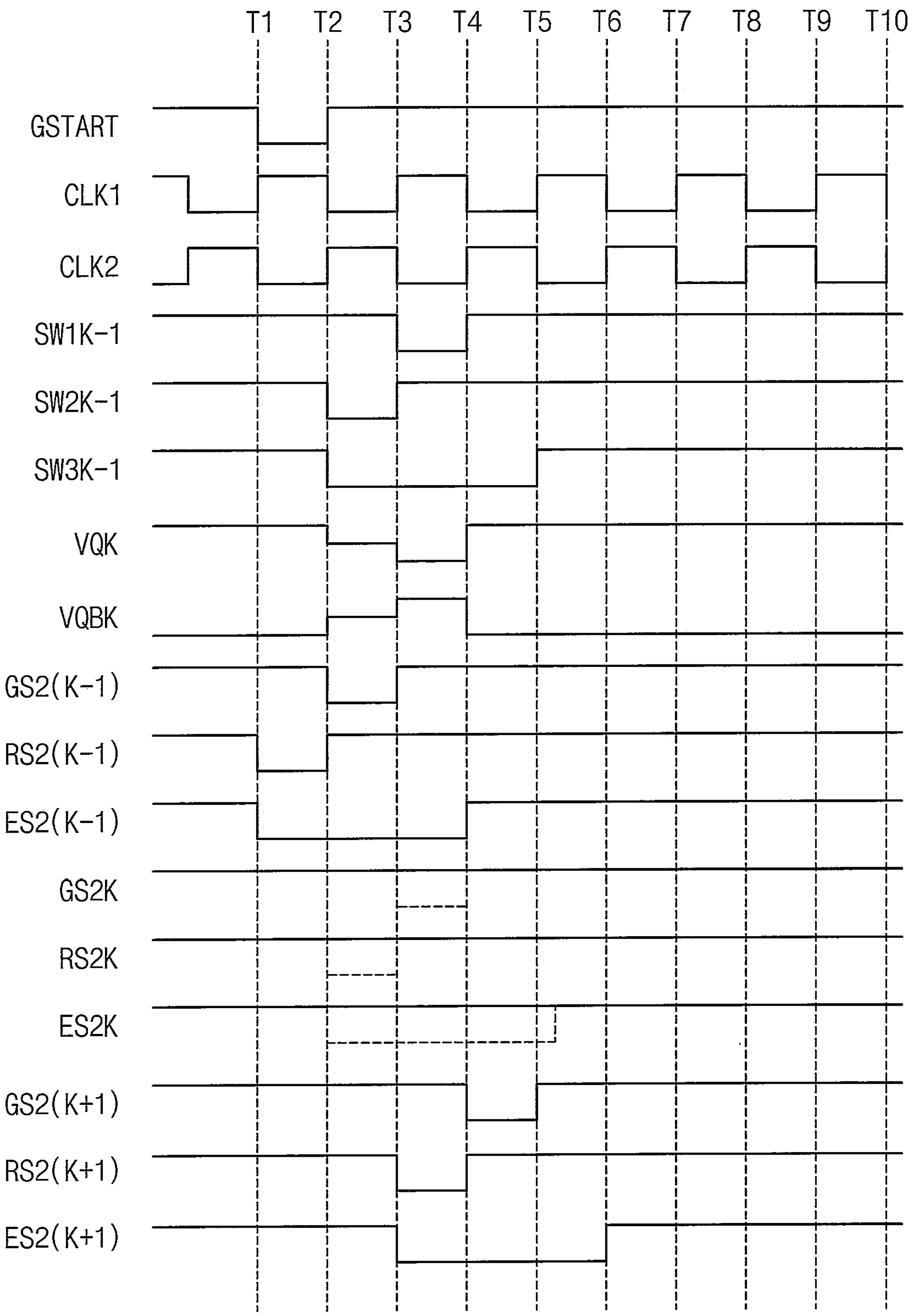
FIG. 14 is a timing diagram for describing an operation of the switch circuit of FIG. 13.

FIG. 14 is a timing diagram for describing an operation of the switch circuit of FIG. 13.

Referring to FIGS. 10, 12, 13 and 14, in each of the switch circuit 205-1 and the switch circuit 205-2, an operation in which switch control signals are provided to the gate switch circuit, the gate reset switch circuit and the emission switch circuit is different. Thus, voltage levels of the switch control signals SW1K−1, SW2K−1 and SW3K−1 provided to the switch circuit 205-2 of FIG. 13 may be inverted from voltage levels of the switch control signals SW1K, SW2K and SW3K provided to the switch circuit 205-1 of FIG. 10.

However, the switch circuit 205-1 of FIG. 10 and the switch circuit 205-2 of FIG. 13 operate in the same manner except for the voltage levels of the switch control signals. Thus, each of the switch circuits included in the driving control circuit of FIG. 9 may be implemented using one of the switch circuit in FIG. 10 and the switch circuit in FIG. 13, but example embodiments are not limited thereto.

Figure 15:
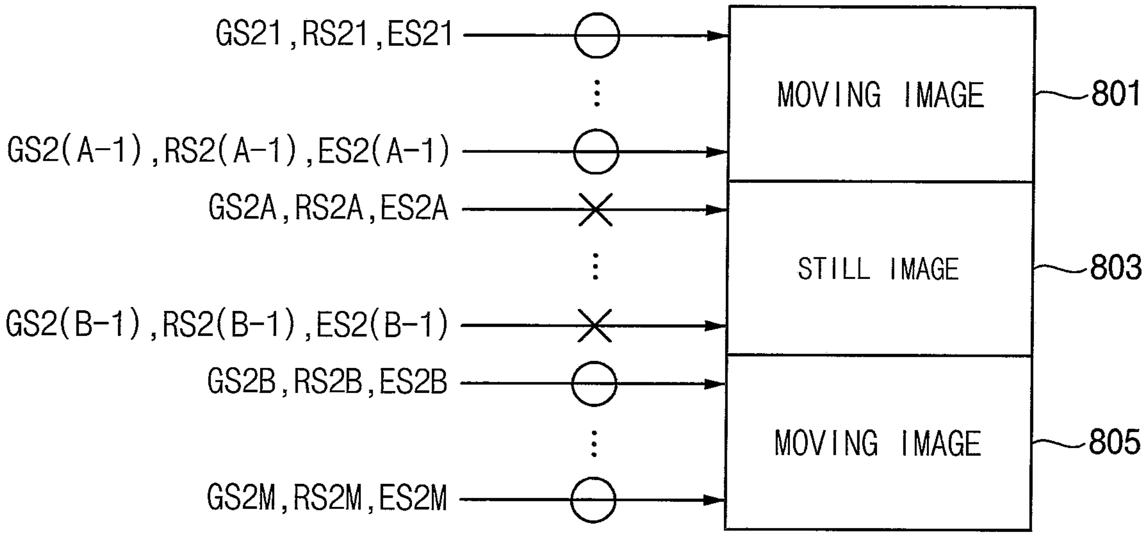
FIG. 15 is a diagram for describing driving signals provided to the display panel according to operations of the switch circuit of FIG. 10 or 13.

FIG. 15 is a diagram for describing driving signals provided to the display panel according to operations of the switch circuit of FIG. 10 or 13.

Referring to FIG. 15, each of a first area 801, a second area 803 and a third area 805 may correspond to a portion of area in which the display area DA of the display panel 600 described above with reference to FIG. 1 is divided. For example, the first area 801 is an area from a first row to a (A−1)-th row of the display area DA, where A is an integer greater than or equal to two. The second area 803 is an area from a A-th row to a (B−1)-th row of the display area DA, where B is an integer greater than the A. The third area 805 is an area from a B-th row to the last row, e.g., M-th row, of the display area DA.

In some embodiments, the second area 803 may correspond to the first display area in which an updating operation is unnecessary as described above with reference to FIG. 1. The first area 801 and the third area 805 may correspond to a second display area different from the first display area. For example, a moving image may be displayed in the first area 801 and the third area 805, and a still image may be displayed in the second area 803.

In some embodiments, driving signals GS21, . . . , GS2(A−1), and ES21, . . . , ES2(A−1) and reset signal RS21, . . . , RS2(A−1) may be provided to the first area 801, and driving signals GS2B, . . . , GS2M, and ES2B, . . . , ES2M and reset signal RS2B, . . . , RS2M may be provided to the third area 805. However, driving signals GS2A, . . . , GS2(B−1), and ES2A, . . . , ES2(B−1) and reset signal RS2A, . . . , RS2(B−1) may be blocked by the driving control signal generated by the driving control signal generator 200 described above with reference to FIG. 1.

Figure 16:
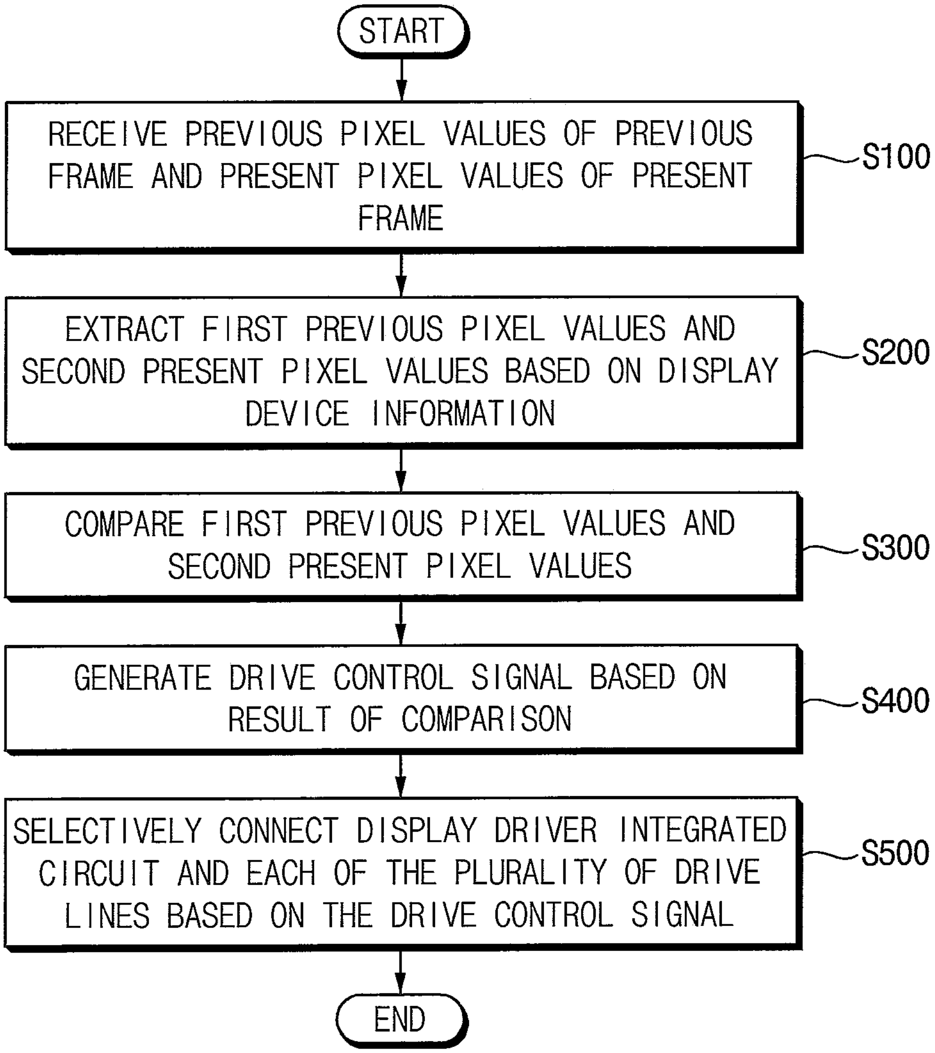
FIG. 16 is a flowchart illustrating a method of operating a display device according to example embodiments.

FIG. 16 is a flowchart illustrating a method of operating a display device according to example embodiments.

Referring to FIG. 16, a plurality of previous pixel values of a previous frame and a plurality of present pixel values of a present frame displayed on a display area of a display panel may be received (S100). In some embodiments, the operation S100 may be performed by the timing controller 500 and the driving control signal generator 550 described above with reference to FIG. 1.

First previous pixel values among the plurality of previous pixel values and second present pixel values among the plurality of present pixel values are extracted based on display device information (S200). The first previous pixel values may correspond to a first row group, and the second present pixel values may correspond to a second row group. Each of the first row group and the second row group may correspond to a K-th row among a plurality of rows in which a plurality of pixels are disposed, where K is an integer greater than or equal to one. In some embodiments, the operation S200 may be performed by the driving control signal generator 550 described above with reference to FIG. 1 and the data extraction circuit 551 described above with reference to FIG. 2.

The first previous pixel values may be compared with the second present pixel values (S300). In some embodiments, the operation S300 may be performed by the driving control signal generator 550 described above with reference to FIG. 1 and the data comparison circuit 553 described above with reference to FIG. 2. In some embodiments, the operation S300 may include generating first checksum data related to the first previous pixel values, generating second checksum data related to the second present pixel values, and comparing the first checksum data with the second checksum data according to the operations described above with reference to FIG. 2.

A driving control signal may be generated based on a result of the comparison such that first driving signals provided to first driving lines among the plurality of driving are blocked (S400). The first driving lines may correspond to a first display area in which an updating operation is unnecessary in the display area. In some embodiments, the operation S400 may be performed by the driving control signal generator 550 described above with reference to FIG. 1 and the driving control signal generator 555 described above with reference to FIG. 2.

A display driver integrated circuit and each of the plurality of driving lines may be selectively connected based on the driving control signal (S500). In some embodiment, the operation S500 may be performed by the driving control circuit 200 described above with reference to FIG. 1.

Figure 17:
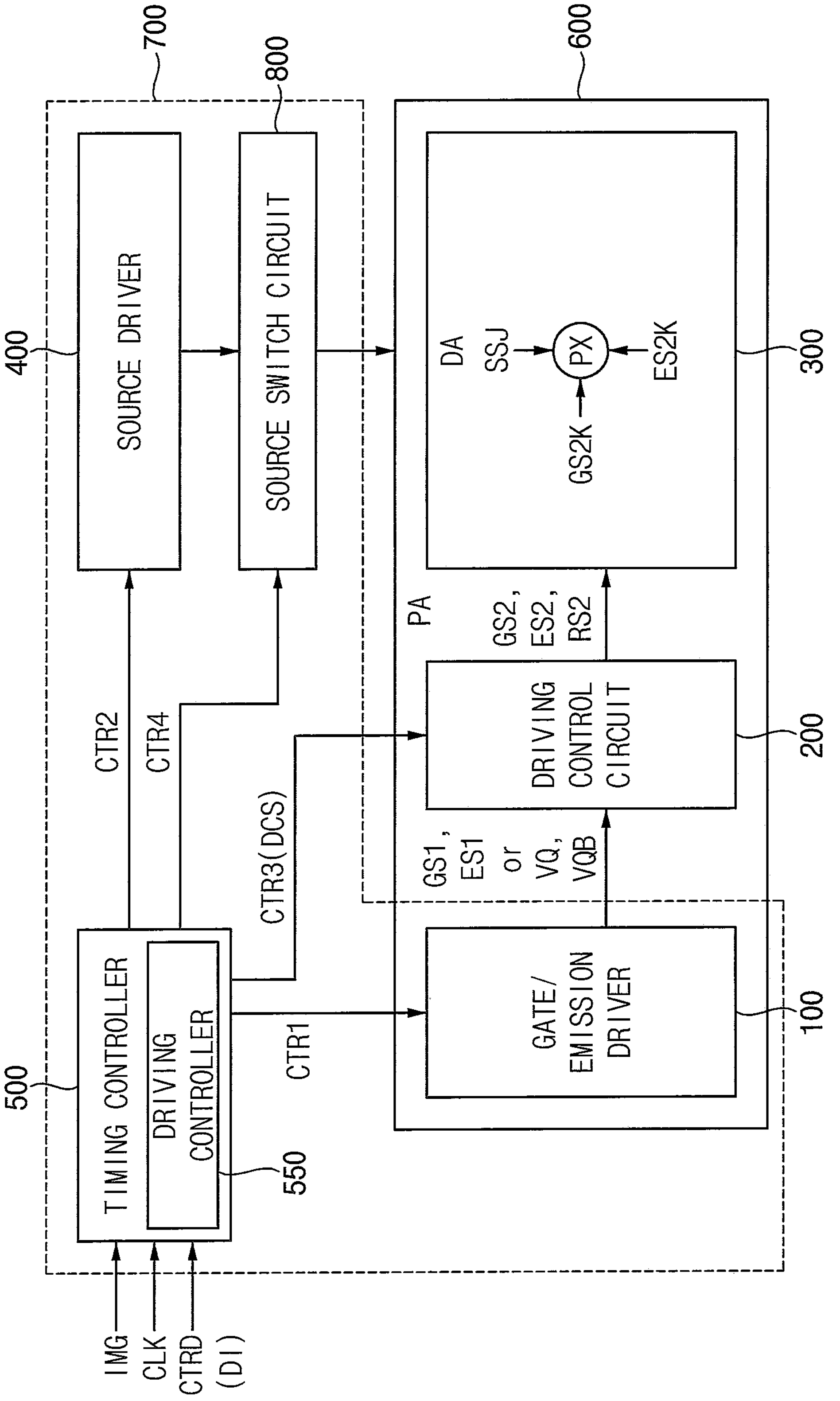
FIG. 17 is a block diagram illustrating a display device according to example embodiments.

FIG. 17 is a block diagram illustrating a display device according to example embodiments.

Referring to FIGS. 1 and 17, a display device 10*a* has the same configuration as that of the display device 10 of FIG. 1 except that the display device 10*a* further includes a source switch circuit 800. Thus, repeated descriptions will be omitted.

The source switch circuit 800 may selectively connect a display driver integrated circuit 700 with each of a plurality of source lines included in a display area DA of a display panel 600.

In some embodiments, the driving control signal generator 550 may generate a source control signal CTR4 such that first image signals provided to first source lines among the plurality of source lines are blocked.

Figure 18:
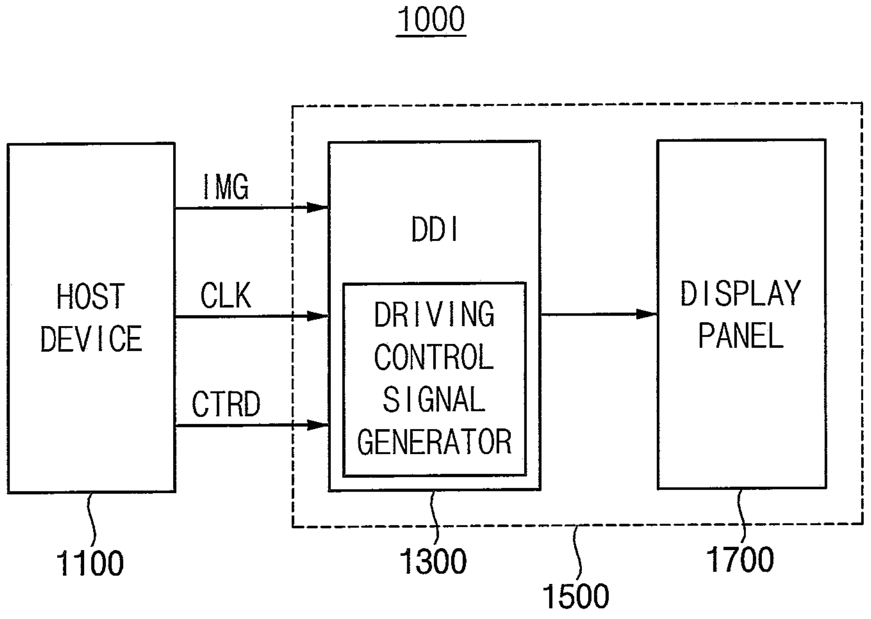
FIG. 18 is a block diagram illustrating an example embodiment of a display system including the display device of FIG. 1.

FIG. 18 is a block diagram illustrating an example embodiment of a display system including the display device of FIG. 1.

A display system 1000 in FIG. 18 may be included in various electronic devices having a function of image display such as a mobile phone, a smartphone, a tablet personal computer (PC), a personal digital assistant (PDA), a wearable device, a potable multimedia player (PMP), a handheld device, a handheld computer, and so on.

Referring to FIG. 18, the display system 1000 may include a host device 1100 and a display device 1500. The display device 1500 may include a display driving integrated circuit DDI 1300 and a display panel 1700.

The host device 1100 may control overall operations of the display system 1000. The host device 1100 may be an application processor (AP), a baseband processor (BBP), a micro-processing unit (MPU), and so on. The host device 1100 may provide image data IMG, a clock signal CLK and control signals CTRD to the display device 1500. For example, the image data IMG may include RGB pixel values and have a resolution of w×h, where w is a number of pixels in a horizontal direction and h is a number of pixels in a vertical direction.

The control signals CTRD may include a command signal, a horizontal synchronization signal, a vertical synchronization signal, a data enable signal, and so on. For example, the image data IMG and the control signals CTRD may be provided, as a form of a packet, to the DDI 1300 in the display device 1500. The command signal may include control information, image information and/or display device information DI described above with reference to FIG. 1. The image information may include, for example, a resolution of the input image data IMG. The display device information may include, for example, panel information, a luminance setting value, and so on.

The DDI 1300 may drive the display panel 1700 based on the image data IMG and the control signals CTRD. The DDI 1300 may convert the digital image signal IMG to analog signals and drive the display panel 1700 based on the analog signals.

In some embodiments, the DDI 1300 may include the driving control signal generator 500 described above with reference to FIG. 1, and the display panel 1700 may include the driving control circuit describe above with reference to FIG. 1.

Figure 19:
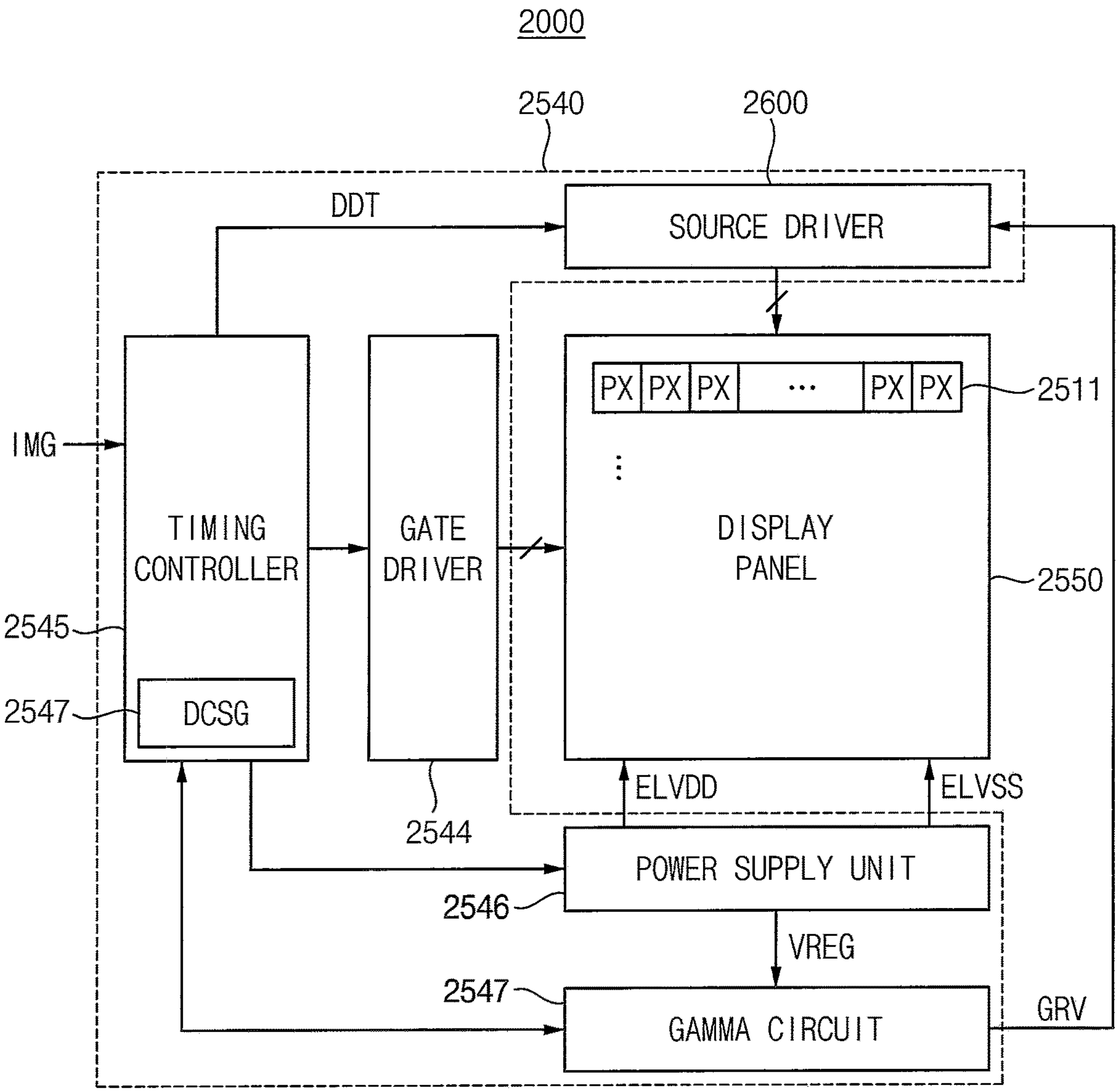
FIG. 19 is a block diagram illustrating a display device according to example embodiments.

FIG. 19 is a block diagram illustrating a display device according to example embodiments.

FIG. 19 illustrates, as an example, an electroluminescence display device such as an OLED display device and embodiments are not limited to a specific kind of a display device.

Referring to FIG. 19, an electroluminescent display device 2000 may include a display panel 2550 including a plurality of pixel rows 2511 and a DDI 2540 that drives the display panel 2550. The DDI 2540 may include a data driver or a source driver 2600, a gate driver 2544, a timing controller 2545, a power supply unit 2546, and a gamma circuit 2547.

The display panel 2550 may be connected to the source driver 2600 of the DDI 2540 through a plurality of source lines and may be connected to the gate driver 2544 of the DDI 2540 through a plurality of scan lines. The display panel 2550 may include the pixel rows 2511. That is, the display panel 2550 may include a plurality of pixels PX arranged in a matrix having a plurality of rows and a plurality of columns One row of pixels PX connected to the same scan line may be referred to as one pixel row 2511. In some embodiments, the display panel 2550 may be a self-emitting display panel that emits light without the use of a back light unit. For example, the display panel 2550 may be an organic light-emitting diode (OLED) display panel.

Each pixel PX included in the display panel 2550 may have various configurations according to a driving scheme of the display device 2000. For example, the electroluminescent display device 2000 may be driven with an analog or a digital driving method. While the analog driving method produces grayscale using variable voltage levels corresponding to input data, the digital driving method produces grayscale using variable time duration in which the LED emits light. The analog driving method is difficult to implement because the analog driving method uses a DDI that is complicated to manufacture if the display is large and has high resolution. The digital driving method, on the other hand, may readily accomplish high resolution through a simpler circuit structure. As the size of the display panel becomes larger and the resolution increases, the digital driving method may have more favorable characteristics over the analog driving method. The display device according to embodiments may be applied to both the analog driving method and the digital driving method.

The source driver 2600 may apply a data signal to the display panel 2550 through the source lines based on display data DDT. The gate driver 2544 may apply a gate driving signal to the display panel 2550 through the gate lines.

The timing controller 2545 may control the operation of the display device 2530. The timing controller 2545 may provide predetermined control signals to the source driver 2600 and the gate driver 2544 to control the operations of the display device 2000. In some embodiments, the source driver 2600, the gate driver 2544 and the timing controller 2545 may be implemented as one integrated circuit (IC). In other embodiments, the source driver 2600, the gate driver 2544 and the timing controller 2545 may be implemented as two or more integrated circuits. A driving module including at least the timing controller 2545 and the gate driver 2600 may be referred to as a timing controller embedded data driver (TED).

The timing controller 2545 may receive the image data IMG and the control signals from the host device 1100 in FIG. 18. For example, the image data IMG may include red (R) image data, green (G) image data and blue (B) image data. According to embodiments, the image data IMG may include white image data, magenta image data, yellow image data, cyan image data, and so on. The control signals may include a master clock signal, a data enable signal, a horizontal synchronization signal, a vertical synchronization signal, and so on.

The power supply unit 2546 may supply the display panel 2550 with a high power supply voltage ELVDD and a low power supply voltage ELVSS. In addition, the power supply unit 2546 may supply a regulator voltage VREG to the gamma circuit 2547. The gamma circuit 2547 may generate gamma reference voltages GRV based on the regulator voltage VREG. For example, the regulator voltage VREG may be the high power supply voltage ELVDD or another voltage that is generated based on the high power supply voltage ELVDD.

As described above, the display device for low power driving and the method of operating the display device according to example embodiments may block the first driving signals provided to the first driving lines corresponding to the first display area. In a foldable display device, a rollable display device and a slideable display device in which the display area may be expanded or contracted, the display device according to example embodiments may block the first driving signals to driving lines corresponding to the display area that do not need to be driven before the display area is expanded. Accordingly, power consumption in a display driver integrated circuit and a display panel included in the display device may be effectively reduced. When the display area is expanded, the display device according to example embodiments may provide the first driving signals again to the driving lines corresponding to the expanded display area. Accordingly, the display device according to example embodiments may enable smooth screen switching in the display system when the display area is expanded or contracted.

Example embodiments may be usefully used in a display device and a system including the display device. For example, embodiments may be more usefully applied to a computer, a laptop, a cellular phone, a smart phone, a personal digital assistant (PDA), a portable multimedia player (PMP), a digital TV, a digital camera, a portable game console, a navigation device, a wearable device, an IoT (internet of things) device, an IoE (internet of everything) device, an e-book, virtual reality (VR) devices, augmented reality (AR) devices, in-vehicle navigation systems, video phones, surveillance systems, automatic focus systems, tracking systems, motion detection systems and the like.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

The foregoing is illustrative of embodiments and is not to be construed as limiting thereof. Although some embodiments have been described, those skilled in the art will readily appreciate that many modifications are possible in the embodiments without materially departing from the novel teachings and advantages of the embodiments. Accordingly, all such modifications are intended to be included within the scope of the embodiments as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

first pixels; and a driving control circuit that precludes the first pixels from displaying next pixel values in response to determining a similarity between the next pixel values and previous pixel values displayed by the first pixels exceeds a threshold amount, wherein the similarity is determined from a comparison of a most-significant bit of each next pixel value, among the next pixel values, with a most-significant bit of a corresponding one of the previous pixel values.

2. The display device of claim 1, wherein each of the first pixels is driven by the same driving signal.

3. The display device of claim 1, wherein the first pixels constitute a row of a pixel matrix.

4. The display device of claim 1, further comprising:

second pixels, wherein the driving control circuit simultaneously precludes the first pixels from displaying next pixel values while controlling the second pixels to display other next pixel values.

5. The display device of claim 4, wherein the first pixels constitute a first row of a pixel matrix and the second pixels constitute a second row of the pixel matrix.

6. The display device of claim 5, wherein each of the first pixels is driven by the same first driving signal and each of the second pixels is driven by the same second driving signal.

* * * * *